(12) United States Patent
Ogiwara et al.

(10) Patent No.: US 7,405,865 B2
(45) Date of Patent: Jul. 29, 2008

(54) LIQUID FOR ELECTROPHORETIC DISPLAY, DISPLAY MEDIUM AND DISPLAY DEVICE USING THE SAME

(75) Inventors: Yasuaki Ogiwara, Fujioka (JP); Atsushi Sato, Fujioka (JP); Takahiro Osada, Fujioka (JP); Takao Koyama, Fujioka (JP)

(73) Assignee: Mitsubishi Pencil Co., Ltd., Tokyo (JP)

( * ) Notice: Subject to any disclaimer, the term of this patent is extended or adjusted under 35 U.S.C. 154(b) by 370 days.

(21) Appl. No.: 10/570,343

(22) PCT Filed: Aug. 31, 2004

(86) PCT No.: PCT/JP2004/012557

§ 371 (c)(1),
(2), (4) Date: Mar. 3, 2006

(87) PCT Pub. No.: WO2005/024505

PCT Pub. Date: Mar. 17, 2005

(65) Prior Publication Data

US 2007/0002427 A1   Jan. 4, 2007

(30) Foreign Application Priority Data

Sep. 3, 2003 (JP) ............................ 2003-311782
Feb. 24, 2004 (JP) ............................ 2004-048084
Mar. 16, 2004 (JP) ............................ 2004-074664

(51) Int. Cl.
*G02B 26/00* (2006.01)
(52) U.S. Cl. ...................................... 359/296; 252/581
(58) Field of Classification Search ................. 359/296; 252/572, 567, 581; 523/208
See application file for complete search history.

(56) References Cited

U.S. PATENT DOCUMENTS 3,612,758 A    10/1971    Evans et al.

(Continued)

FOREIGN PATENT DOCUMENTS

JP          51-107332 A      9/1976

(Continued)

OTHER PUBLICATIONS

International Search Report corresponding to PCT/JP 2004/012557 issued on Oct. 5, 2004, 1 page.

(Continued)

*Primary Examiner*—Timothy J Thompson
(74) *Attorney, Agent, or Firm*—Buchanan Ingersoll & Rooney PC

(57) ABSTRACT

A medium for electrophoretic display using a liquid for electrophoretic display which can reversibly change a visible state by action of an electric field includes a medium comprising each independent structures of microcapsules or cells filled with a liquid for electrophoretic display comprising at least alkylpolyetheramine having a structural unit represented by a specific structural formula, one or more kinds of fine particles, a dispersant and a dispersion liquid medium, wherein the fine particles contain fine particles subjected to surface treatment for making lipophilic. Also, an electrophoretic display device includes a display device comprising a pair of substrates in which a light-transmitting electrode is formed on at least one substrate and the medium for electrophoretic display described above between the substrates.

The electrophoretic display medium and the electrophoretic display device each using the above display liquid for electrophoretic display have a high contrast on a display face and can display the contrast with high reliability even in repetitive display, and they are excellent as well in a response.

20 Claims, 5 Drawing Sheets

U.S. PATENT DOCUMENTS

| | | | |
|---|---|---|---|
| 6,113,810 | A | 9/2000 | Hou et al. |
| 6,400,492 | B1 | 6/2002 | Morita et al. |
| 6,693,621 | B1 | 2/2004 | Hayakawa et al. |
| 6,776,829 | B2 | 8/2004 | Miyamoto et al. |
| 6,816,146 | B2 * | 11/2004 | Harada et al. ............... 345/107 |
| 2004/0249018 | A1 | 12/2004 | Kataoka et al. |

FOREIGN PATENT DOCUMENTS

| | | | |
|---|---|---|---|
| JP | 62-269124 | A | 11/1987 |
| JP | 2733687 | B2 | 1/1988 |
| JP | 63-50886 | A | 3/1988 |
| JP | 64-086116 | A | 3/1989 |
| JP | 02-284128 | A | 11/1990 |
| JP | 03-266818 | A | 11/1991 |
| JP | 05-173193 | A | 7/1993 |
| JP | 07-216256 | A | 8/1995 |
| JP | 2551783 | B2 | 8/1996 |
| JP | 8-510790 | A | 11/1996 |
| JP | 11-119704 | A | 4/1999 |
| JP | 2001-056653 | A | 2/2001 |
| JP | 2001-342411 | A | 12/2001 |
| JP | 2002-277903 | A | 9/2002 |
| JP | 2002-283715 | A | 10/2002 |
| JP | 2002-350904 | A | 12/2002 |
| JP | 2003-147241 | A | 5/2003 |
| JP | 2003-149691 | A | 5/2003 |
| JP | 2003-183582 | A | 7/2003 |
| JP | 2003-192956 | A | 7/2003 |
| WO | WO 94/28202 | A1 | 12/1994 |
| WO | WO 98/03896 | A1 | 1/1998 |
| WO | 03/013148 | A2 | 2/2003 |

OTHER PUBLICATIONS

Fitzhenry-Ritz, F.; "Optical Properties of Electrophoretic Image Displays"; Biennial Display Research Conference; Oct. 21-23, 1980; pp. 13-25; 80 CH1520-6ED; IEEE.

Vance, Dennis W.; "Optical Characteristics of Electrophoretic Displays"; Proceeding of the Society for Information Display; Third & Fourth Quarters 1977; pp. 267-274; vol. 18/3&4.

* cited by examiner

LIQUID FOR ELECTROPHORETIC DISPLAY, DISPLAY MEDIUM AND DISPLAY DEVICE USING THE SAME

CROSS-REFERENCE TO PRIORITY APPLICATIONS

This application claims priority under 35 U.S.C. §119 of JP 2003-311782, filed Sep. 3, 2003; JP 2004-048084, filed Feb. 24, 2004, and JP 2004-074664, filed Mar. 16, 2004, and is a continuation of PCT/JP 2004/012557, filed Aug. 31, 2004, which designated the United States and was published on Mar. 17, 2005, as WO 2005/024505 A1, each hereby expressly incorporated by reference in its entirety and each assigned to the assignee hereof.

TECHNICAL FIELD

The present invention relates to a display liquid for electrophoretic display which can reversibly change a visible state by action of an electrical field and a display medium and a display device each using the same.

BACKGROUND ART

In recent years, demands for reduction in electric power consumption, reduction in a thickness and flexibility of display devices are increased as information devices develop, and research and development of display devices which meet the above demands are actively carried out.

An electrophoretic display device invented by Harold D. Lees et al. is known as one of such display devices. This electrophoretic display device has a structure in which two electrode substrates at least one of which is transparent are oppositely disposed via suitable spacers and in which a display liquid prepared by dispersing fine particles (pigment particles) in a dispersion medium that is colored differently from the color of the particles is filled into the space between the electrode substrates to form a display panel, and display is shown on the transparent electrode surface by applying an electric field to the display panel (refer to, for example, patent document 1).

A liquid for electrophoretic display filled into the space between the electrode substrates is constituted from fine particles of titanium oxide and the like (pigment particles), a dispersion medium having a low dielectric constant such as xylene, tetrachloroethylene, paraffin and silicone oil in which a dye for giving a contrast of a color to the fine particles is dissolved, a dispersant such as a surfactant and the like and additives such as a charge-providing agent and the like. The fine particles in the display liquid transfer to a transparent electrode side by applying an electric field to the liquid for electrophoretic display to allow the color of the fine particles to appear on the display face. Further, the fine particles transfer to an opposite side by applying an electric field of a direction which is reverse to the above to allow the color of the dispersion medium colored by the dye to appear on the display face.

Such an electrophoretic display device is a display device in which desired display can be obtained by controlling a direction of an electric field, and it has the advantages that it costs low and has as a broad visibility angle as those of printed matters and that it is small in electric power consumption and has a memory property of display, so that it is paid attentions as an inexpensive display device.

However, since a display liquid for the above electrophoretic display device described in the patent document 1 is prepared usually by dispersing an inorganic pigment having a high refractive index such as titanium dioxide and the like in a hydrophobic dispersion medium having a low dielectric constant which is colored by dissolving a dye, it is difficult to control dispersion stability, and it has the defects that coagulation brings about reduction in the contrast and the repetitive display characteristics and reduction in the display quality. Further, since the dye solution is used, it has the defect that the contrast is weakened by adsorption of the dye onto the pigment surfaces.

Accordingly, a lot of developments for stabilizing the dispersion systems and improving the display characteristics has so far been made in order to solve the above problems.

For example, an art in which sorbitan fatty acid ester surfactants are added in a system using electrophoretic particles subjected to surface treatment with a coupling agent of titanate in a dispersion medium colored by a dye is known as a means for raising the dispersion stability (refer to, for example, patent document 2).

Further, it is known that one of two kinds of electrophoretic particles having different charging states is treated with a quaternary ammonium salt compound and a surfactant is further added thereto (refer to, for example, patent document 3).

On the other hand, it is known as a means for improving the contrast that a dye which is non-adsorptive to a pigment surface is used as a dye used for coloring a dispersion medium (refer to, for example, non-patent document 1) and that a dye concentration in a dispersion medium is to be low (refer to, for example, non-patent document 2).

Further, a method in which microcapsules encapsulated a display liquid for electrophoretic display are used as display particles (refer to, for example, patent document 4) is known as a method for preventing unequal display caused by uneven distribution of electrophoretic fine particles on a display face.

However, the art described in the patent document 2 is unsatisfactory in an effect of dispersion stabilization and still has a problem in that a satisfactory effect is not obtained as well in a contrast of display.

Also, a satisfactory dispersion stability is not obtained as well in the art described in the above patent document 3, and the effect is unsatisfactory.

Further, the methods described in the non-patent documents 1 and 2 do not come to completely solve the defects brought about by the dye solutions and still have problems in terms of practical use.

In the method of the patent document 4 described above, a colored dye solution and a dispersion liquid of pigment particles are used for an encapsulated display liquid, and therefore it is not satisfactory in terms of a contrast as is the case with the phenomenon described above.

Then, an electrophoretic display device in which a dye solution is not used is known as a means for solving the problems involved in the systems in which a dispersion medium colored by dyes is used. Known is, for example, an electrophoretic display element in which a liquid prepared by dispersing at least two kinds of electrophoretic fine particles which are different from each other in a color tone and an electrophoretic property in a colorless dispersion medium is filled in a cell formed between two counter electrodes at least one of which is transparent via spacers (refer to, for example, patent document 5).

Also, use of a steric repulsion effect brought about by addition of a charge-controlling agent and surface treatment of particles is known as a means for preventing coagulation between particles which is a problem in a system using, as a display liquid for electrophoretic display, the above liquid prepared by dispersing two kinds of the electrophoretic fine particles which are different from each other in a color tone and an electrophoretic property (electrified charge) (refer to, for example, patent document 6).

Further, known is an electrophoretic display element using a liquid prepared by dispersing at least two kinds of electrophoretic fine particles which have the same electrophoretic property and which are different from each other in an electrophoretic speed in a colorless dispersion medium (refer to, for example, patent document 7).

Also, known is a display liquid for electrophoretic device containing particles which are subjected to surface treatment and have voids in the inside and pigment particles having a color tone which is different from that of the above particles in a dispersion medium (refer to, for example, patent document 8).

Further, known as well is an art in which a liquid prepared by dispersing at least two kinds of electrophoretic fine particles which are different from each other in a color tone and an electrophoretic property in a colorless dispersion medium is encapsulated in microcapsules (refer to, for example, patent document 9).

However, in the art described in the patent document 5 described above, an electrified charge of the different electrophoretic fine particles is combination of a positive charge and a negative charge, and therefore involved therein is the problem that electric attracting force is produced between the fine particles to cause coagulation of the fine particles, whereby the dispersion stability is reduced to bring about deterioration in the contrast by mixed color.

Also, in the art described in the patent document 6 described above, involved therein is the problem that it is difficult to completely prevent two kinds of the electrophoretic fine particles from being coagulated, so that the good contrast can not be realized.

Further, even the fine particles having a slow moving speed described in the above patent document 7 are in a shorter moving distance when present close to the electrode on the display face and therefore appear on the display face in a certain case. Also, an electrified charge is usually different even between particles having the same color tone, and the moving speeds have distribution. Accordingly, a problem is involved in that it is difficult to obtain the satisfactory contrast without controlling so that the particles are not superposed among those having different color tones.

Further, in the particles having voids in the inside described in the above patent document 8, the dispersion liquid medium gets into the voids, and therefore particularly the white particles are reduced in a refractive index, which makes it difficult to obtain the satisfactory contrast.

Also in the case described in the above patent document 9, stability of the dispersion liquid is not maintained, and there still remains the problem that color mixing caused by coagulation due to electric attracting force between the electrophoretic fine particles is generated in the microcapsule to bring about color mixing of display.

Patent document 1: U.S. Pat. No. 3,612,758 (claims, examples and others)

Patent document 2: U.S. Pat. No. 2,733,687 (claims, examples and others)

Patent document 3: Japanese Patent Application Laid-Open No. 119704/1999 (claims, examples and others)

Non-patent document 1: Philips Lab: Conference Record of 1980 Biennial Disp. Res. Conf.

Non-patent document 2: Xerox Palo Alto: Proc. SID, Vol. 18 3/4, 1977

Patent document 4: Japanese Patent No. 2551783 (claims, examples and others)

Patent document 5: Japanese Patent Application Laid-Open No. 269124/1987 (claims, examples and others)

Patent document 6: Published Japanese translation of PCT International Publication for Patent Application No. 510790/1996 (claims, examples and others)

Patent document 7: Japanese Patent Application Laid-Open No. 50886/1988 (claims, examples and others)

Patent document 8: U.S. Patent Application Japanese Patent Application Laid-Open No. 2002-277903 (claims, examples and others)

Patent document 9: U.S. WO98/03896 (claims, examples and others)

DISCLOSURE OF THE INVENTION

Problems to be Solved by the Invention

In light of the problems of the conventional art described above and the existing situation, the present invention intends to solve them, and an object thereof is to provide a liquid for electrophoretic display which can realize display having a high contrast by improving dispersion stability of the liquid for electrophoretic display and can display a contrast with high reliability even in repetitive display and which is excellent in a response, a display medium and a display device each using the same.

Means for Solving the Problems

Intensive investigations on the problems of the conventional art described above repeated by the present inventors have resulted in finding that a liquid for electrophoretic display which meets the object described above, and a display medium and a display device each using the same are obtained by adding a specific component to a liquid comprising one or more kinds of fine particles, a dispersant and a dispersion liquid medium, and thus the present invention has come to be completed.

That is, the present invention comprises the following items (1) to (24).

(1) A liquid for electrophoretic display comprising at least alkylpolyetheramine having a structural unit represented by the following Formula (I), one or more kinds of fine particles, a dispersant and a dispersion liquid medium, wherein the fine particles described above contain fine particles subjected to surface treatment for making lipophilic:

in Formula (I) described above, $R_1$ is a saturated hydrocarbon group or an unsaturated hydrocarbon group; $R_2$ is $(CH_2CH_2O)x\text{-}H$; $R_3$ is $(CH_2CH_2O)y\text{-}H$; and x and y are positive numbers.

(2) A liquid for electrophoretic display comprising at least alkylpolyetheramine having a structural unit represented by the following Formula (I), a polyoxyethylene oxypropylene block polymer having a structural unit represented by the following Formula (II), one or more kinds of fine particles and a dispersion liquid medium:

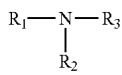

in Formula (I) described above, $R_1$ is a saturated hydrocarbon group or an unsaturated hydrocarbon group; $R_2$ is $(CH_2CH_2O)x\text{-}H$; $R_3$ is $(CH_2CH_2O)y\text{-}H$; and x and y are positive numbers;

$$OH(C_2H_4O)p(C_3H_6O)qH \qquad (II)$$

in Formula (II) described above, p and q are positive numbers.

(3) The liquid for electrophoretic display as described in the above item (2), further comprising an acetylene derivative having a structural unit represented by the following Formula (III):

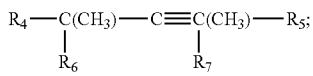

in Formula (III) described above, $R_4$ and $R_5$ are a saturated hydrocarbon group or an unsaturated hydrocarbon group; $R_6$ is $OCH_2CH(CH_3)OH$ or $(OCH_2CH_2)m\text{-}OH$; $R_7$ is $OCH_2CH(CH_3)OH$ or $(OCH_2CH_2)n\text{-}OH$; m and n are 0 or positive numbers; and $R_6$ and $R_7$ may be the same or different.

(4) The liquid for electrophoretic display as described in the above item (2) or (3), wherein the polyoxyethylene oxypropylene block polymer has an average molecular weight of 1000 to 4000.

(5) The liquid for electrophoretic display as described in any one of the above items (2) to (4), wherein an amount of ethylene oxide in the polyoxyethylene oxypropylene block polymer is 50% by weight or less.

(6) The liquid for electrophoretic display as described in any one of the above items (2) to (5), wherein a content of the polyoxyethylene oxypropylene block polymer is 0.01 to 30% by weight based on the total amount of the display liquid.

(7) The liquid for electrophoretic display as described in any one of the above items (3) to (6), wherein an HLB of the acetylene derivative is 10 or less.

(8) The liquid for electrophoretic display as described in any one of the above items (2) to (7), wherein the fine particles are subjected to surface treatment for making lipophilic.

(9) The liquid for electrophoretic display as described in any one of the above items (1) to (8), wherein the surface treatment for making lipophilic is carried out with a coupling agent.

(10) The liquid for electrophoretic display as described in the above item (9), wherein the coupling agent is at least one selected from the group consisting of titanate base coupling agents, aluminum base coupling agents and silane base coupling agents.

(11) The liquid for electrophoretic display as described in any one of the above items (1) to (10), wherein a surface functional group of the fine particles subjected to the surface treatment for making lipophilic is an alkoxycarbonyl group.

(12) The liquid for electrophoretic display as described in any one of the above items (1) to (11), wherein a content of the alkylpolyetheramine is 1.0 to 200% by weight based on a content of the fine particles.

(13) The liquid for electrophoretic display as described in any one of the above items (1) to (12), wherein at least one kind of the fine particles is polymer fine particles containing a colorant, an organic pigment or an inorganic pigment.

(14) The liquid for electrophoretic display as described in the above item (13), wherein a structural component of the polymer fine particles containing a colorant is a cross-linked acryl base resin.

(15) The liquid for electrophoretic display as described in any one of the above items (1) to (14), wherein the fine particles have a mean particle size of 0.05 to 20 μm.

(16) The liquid for electrophoretic display as described in any one of the above items (2) to (15), further comprising a dispersant.

(17) The liquid for electrophoretic display as described in any one of the above items (1) to (16), wherein the dispersant is a nonionic or anionic surfactant.

(18) The liquid for electrophoretic display as described in any one of the above items (1) to (17), wherein a content of the dispersant is 0.01 to 50% by weight based on the total amount of the display liquid.

(19) A medium for electrophoretic display characterized by that the liquid for electrophoretic display as described in any one of the above items (1) to (18) is filled into each independent structures of microcapsules or cells.

(20) The medium for electrophoretic display as described in the above item (19), wherein in the structure of the cell filled with the liquid for electrophoretic display, an electrode part and a cell part with which the liquid for electrophoretic display is brought into contact are subjected to hydrophilization treatment selected from the group consisting of ozone treatment, plasma treatment, corona treatment, UV itoro treatment, sputtering treatment, polymer layer-forming treatment, inorganic layer-forming treatment and organic or inorganic hybrid layer-forming treatment.

(21) The medium for electrophoretic display as described in the above item (19), wherein the microcapsule has a size of 10 to 200 μm.

(22) The medium for electrophoretic display as described in the above item (19) or (21), wherein the microcapsule has flexibility and is less liable to produce a gap in arranging the microcapsules.

(23) The medium for electrophoretic display as described in any one of the above items (19) to (22), wherein the independent cells have a volume of $1 \times 10^{-9}$ to $1 \times 10^{-3}$ ml.

(24) An electrophoretic display device comprising a pair of substrates in which a light-transmitting electrode is formed on at least one substrate and the medium for electrophoretic display as described in any one of the above items (19) to (23) interposed between the above substrates.

Effects of the Invention

According to the present invention, provided are a liquid for electrophoretic display which provides a high contrast on a display face and can display a contrast with high reliability even in repetitive display and which is excellent in a response, a display medium and a display device each using the same.

EXPLANATION OF NUMERALS

Figure 1:
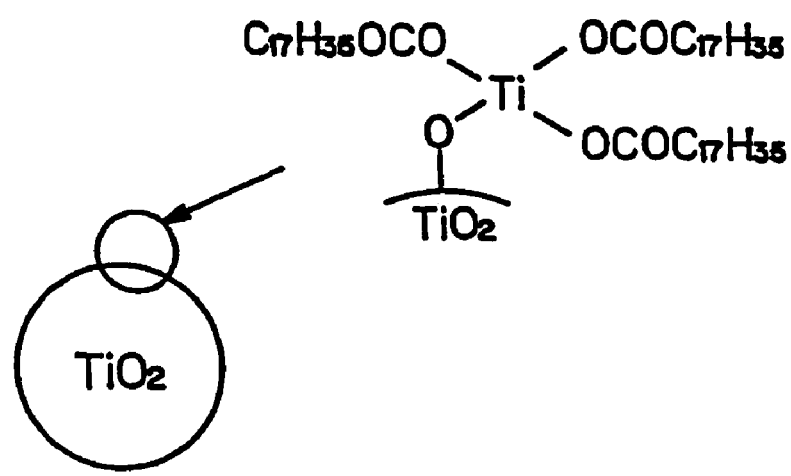
FIG. 1 is an explanatory drawing of a titanium oxide fine particle a surface of which is treated with a titanate coupling agent.

1 Titanium oxide fine particles subjected to treatment for making lipophilic
2 Black solvent
3 Capsule wall
10 Transparent electrode
11 Binder resin layer
12 Microcapsule
13 Counter electrode
14 Cell-forming sheet

BEST MODE FOR CARRYING OUT THE INVENTION

The embodiments of the present invention shall be explained below in details invention by invention.

The liquid for electrophoretic display according to the present invention is constituted from the respective liquids for electrophoretic display which are the first invention to the third invention. To be specific, the liquid for electrophoretic display according to the first invention is characterized by comprising at least alkylpolyetheramine having a structural unit represented by the following Formula (I), one or more kinds of fine particles, a dispersant and a dispersion liquid medium, wherein the fine particles contain fine particles subjected to surface treatment for making lipophilic:

in Formula (I) described above, $R_1$ is a saturated hydrocarbon group or an unsaturated hydrocarbon group; $R_2$ is $(CH_2CH_2O)x\text{-}H$; $R_3$ is $(CH_2CH_2O)y\text{-}H$; and x and y are positive numbers.

Further, the liquid for electrophoretic display according to the second invention is characterized by comprising at least alkylpolyetheramine having a structural unit represented by Formula (I) described above, a polyoxyethylene oxypropylene block polymer having a structural unit represented by the following Formula (II), one or more kinds of fine particles and a dispersion liquid medium, and the liquid for electrophoretic display according to the third invention is characterized by further comprising an acetylene derivative having a structural unit represented by the following Formula (III) in addition to the liquid for electrophoretic display described above according to the second invention:

$$OH(C_2H_4O)p(C_3H_6O)qH \qquad (II)$$

in Formula (II) described above, p and q are positive numbers;

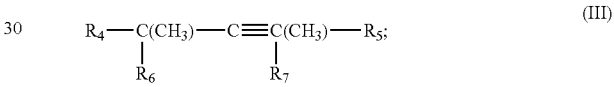

in Formula (III) described above, $R_4$ and $R_5$ are a saturated hydrocarbon group or an unsaturated hydrocarbon group; $R_6$ is $OCH_2CH(CH_3)OH$ or $(OCH_2CH_2)m\text{-}OH$; $R_7$ is $OCH_2CH(CH_3)OH$ or $(OCH_2CH_2)n\text{-}OH$; m and n are 0 or positive numbers; and $R_6$ and $R_7$ may be the same or different.

The alkylpolyetheramine used in the first invention to the third invention is used primarily as a charge-controlling agent and may have the structural unit represented by Formula (I) described above. Capable of being given are, for example, polyethylene glycol laurylamine, polyethylene glycol alkyl (coconut)amine, polyethylene glycol stearylamine, polyethylene glycol alkyl(beef tallow)amine, hydroxyethyllaurylamine, polyethylene glycol alkyl(deer tallow)amine, polyethylene glycol alkyl(sheep tallow)amine. It shall not be restricted to them as long as they are dissolved at least in the dispersion liquid medium used.

When using alkylpolyetheramine which is not included in Formula (I) described above, the contrast on the display face is weak, and the reliability in repetitive display is reduced as well. In addition, the response is deteriorated as well, and therefore it is not preferred.

The alkylpolyetheramine can be used alone (one kind) or in combination of two or more kinds thereof. A content thereof is suitably determined according to the kind thereof, and it is added in a range of preferably 1.0 to 200% by weight (hereinafter referred to merely as "%"), more preferably 10 to 150% based on the fine particles subjected to the surface treatment for making lipophilic in the first invention described later or the fine particles of the second and third inventions.

If the above content of the alkylpolyetheramine is less than 1.0% based on the fine particles subjected to the surface treatment for making lipophilic in the first invention or the fine particles of the second and third inventions, the effect of the alkylpolyetheramine is not exhibited, and the contrast on the display face is weak. The reliability in repetitive display is reduced as well, and the response is deteriorated as well. On the other hand, if it exceeds 200% based on the fine particles subjected to the surface treatment for making lipophilic or the fine particles, an electroconductivity of the solvent is raised, and therefore moving of the fine particles and the contrast display are reduced. Further, that shall become a factor in which the liquid itself for electrophoretic display is broken by electrolysis, and therefore it is not preferred.

For example, colored or colorless (white) inorganic pigment particles, organic pigment particles and polymer fine particles can be used as the fine particles used in the first invention to the third invention, and they can be used alone (one kind) or in a mixture of two or more kinds thereof.

In the first invention, at least the fine particles subjected to the surface treatment for making lipophilic have to be involved in the fine particles used described above from the viewpoint of exhibiting the effects of the present invention, and if at least one kind of the fine particles subjected to the surface treatment for making lipophilic is involved therein, fine particles which are not subjected to the surface treatment for making lipophilic (colored or colorless (white) inorganic pigment particles, organic pigment particles and polymer fine particles) may be involved therein in addition to the above fine particles subjected to the surface treatment for making lipophilic.

In the first invention, if the fine particles subjected to the surface treatment for making lipophilic are not used, the repetitive display and the response are inferior, and stability of the liquid is deteriorated as well, so that the effects of the present invention are not exhibited.

In the second invention and the third invention, even if the fine particles subjected to the surface treatment for making lipophilic are not used, the effects of the present invention can be exhibited as described later.

In the first invention to the third invention, the "pigment particles" described above mean particles which have low solubility in the solvent used as the dispersion liquid medium and which can be present in a dispersed particle state in the solvent.

The inorganic pigment particles which can be used include, for example, titanium dioxide, zinc sulfide, calcium carbonate, silica, calcium silicate, lead white, zinc oxide, lithopone, antimony oxide, kaoline, mica, barium sulfate, gloss white, alumina white, talc, cadmium yellow, cadmium lithopone yellow, yellow iron oxide, titan yellow, titan barium yellow, cadmium orange, cadmium lithopone orange, molybdate orange, red iron oxide, red lead, vermilion, cadmium red, cadmium lithopone red, umber, brown iron oxide, zinc iron, chromium brown, chromium green, chromium oxide, viridian, cobalt green, cobalt chromium green, titan cobalt green, Prussian blue, cobalt blue, ultramarine blue, cerulean blue, cobalt aluminum chromium blue, cobalt violet, mineral violet, carbon black, black iron oxide, manganese ferrite black, cobalt ferrite black, copper chromium black, copper chromium manganese black, black low-level titanium oxide, aluminum powder, copper powder, lead powder, tin powder and zinc powder.

The organic pigment particles which can be used include, for example, fast yellow, diazo yellow, condensed azo yellow, anthrapyrimidine yellow, isoindoline yellow, copper azomethine yellow, quinophthalone yellow, benzimidazolone yellow, nickel dioxime yellow, monoazo yellow lake, dinitoroaniline orange, pyrazolone orange, perinone orange, naphthol red, toluidine red, permanent carmine, brilliant fast scarlet, pyrazolone red, Rhodamine 6G lake, permanent red, lithol red, bon lake red, brilliant carmine, Bordeaux 10B, naphthol red, quinacridone magenta, condensed azo red, naphthol carmine, perylene scarlet, condensed azo scarlet, benzimidazolone carmine, anthraquinonyl red, perylene red, perylene maroon, quinacridone maroon, quinacridone scarlet, quinacridone red, diketopyrrolopyrrole red, benzimidazolone brown, phthalocyanine green, Victoria blue lake, phthalocyanine blue, fast sky blue, alkali blue toner, indanthrone blue, Rhodamine B lake, methyl violet lake, dioxazine violet and naphthol violet.

Polymer fine particles comprising organic polymers produced by known methods can be used as the polymer fine particles and such methods include, for example, a method making use of emulsion polymerization, a seed emulsion polymerization method, a soap free polymerization method, a dispersion polymerization method, a suspension polymerization method, a seed polymerization method, a method making use of seed polymerization & polymerization contraction, a method carrying out suspension polymerization of a W/O/W emulsion, a method making use of drying surfaces of droplets in spray drying and a seed coagulation method in which a polymer emulsion is coagulated by adding electrolytic solid particles. However, they shall not be restricted to those produced by the above methods.

Those selected from polymer materials which have so far been publicly known and which are not dissolved in a transparent dispersion medium used for electrophoretic display can be used as materials for the polymer fine particles. Capable of being given as the examples thereof are polymer materials such as styrene bases, styrene-acryl bases, styrene-isobutylene bases, divinylbenzene bases, methyl methacrylate bases, methacrylate bases, ethyl methacrylate bases, ethyl acrylate bases, n-butyl acrylate bases, acrylic acid bases, acrylonitrile bases, acryl rubber-methacrylate bases, ethylene bases, ethylene-acrylic acid bases, nylon bases, silicone bases, urethane bases, melamine bases, benzoguanamine bases, phenol bases, fluorine (tetrachloroethylene) bases, vinylidene chloride bases, quaternary pyridinium salt bases, synthetic rubbers, celluloses, cellulose acetate, chitosan and calcium alginate and polymer materials which are improved in a solvent resistant function by cross-linking the above polymer materials. In particular, materials containing cross-linked acryl base resins as a component are preferred from the viewpoint of a solvent resistance, but they shall not be restricted to the above polymer materials.

Also, the above polymer fine particles may be colored with dyes and pigments by publicly known methods, such methods include, for example, a method in which monomers are colored before synthesizing to produce the polymer fine particles using the methods described above, a method in which the polymer fine particles are colored in the middle of producing them and a method in which the polymer fine particles are colored after producing them.

Further, in respect to another method, dyes or pigments are physically dispersed in the polymer materials described above which are obtained by synthesizing in advance, and then they are crushed to the desired particle sizes, whereby the fine particles can be obtained. However, the colored polymer fine particles shall not be restricted to those obtained by the above methods.

In the present invention, the fine particles subjected to surface treatment for making lipophilic are those obtained by treating the surface parts of the various fine particles described above (colored or colorless (white) inorganic pigment particles, organic pigment particles and polymer fine particles) with lipophilic surface treating agents.

The lipophilic surface treating agents include, for example, coupling agents, pigment derivatives and lipophilic surfactants, and the coupling agents are particularly preferably used from the viewpoints of dispersibility and fluidity.

The coupling agents which can be used include, for example, silane base coupling agents, titanate base coupling agents, aluminum base coupling agents, zirconium base coupling agents, zircoaluminate base coupling agents, a chromium base coupling agents and fluorine base coupling agents.

The above various coupling agents include, for example, the following ones but shall not be restricted to them.

The titanate base coupling agents include, for example, isopropyltriisostearoyl titanate, isopropyltristearoyl titanate, isopropyltrioctanoyl titanate, isopropyldimethacrylisostearoyl titanate, isopropyltridodecylbenzenesulfonyl titanate, isopropylisostearoyldiacryl titanate, isopropyltri(dioctcylphosphate)titanate, isopropyltricumylphenyl titanate, isopropyltris(dioctcylpyrophosphate)titanate, isopropyltri(n-aminoethyl-aminoethyl)titanate, tetraisopropylbis (dioctcylphosphite)titanate, tetraoctylbis (ditridecylphosphite)titanate, tetra(2,2-diallyloxymethyl-1-butyl)bis(ditridecyl)phosphite titanate, dicumylphenyloxyacetate titanate, bis(dioctcylpyrophosphate)oxyacetate titanate, diisostearoylethylene titanate, bis(dioctcylpyrophosphate)ethylene titanate, bis(dioctcylpyrophosphate)diisopropyl titanate, tetramethyl orthotitanate, tetraethyl orthotitanate, tetrapropyl orthotitanate, tetraisopropyltetraethyl orthotitanate, tetrabutyl orthotitanate, butyl polytitanate, tetraisobutyl orthotitanate, 2-ethylhexyl titanate, stearyl titanate, cresyl titanate monomers, cresyl titanate polymers, diisopropoxy-bis-(2,4-pentadionate)titanium (IV), diisopropoxy-bis-triethanolamino titanate, octylene glycol titanate, titanium lactate, acetoacetic ester titanate, diisopropoxybis(acetylacetonato)titanium, di-n-butoxybis (triethanolaluminato)titanium, dihydroxybis(lactato)titanium, titanium-isopropoxyoctylene glycolate, tetra-n-butoxytitanium polymers, tri-n-butoxytitanium monostearate polymers, butyl titanate dimers, titanium acetylacetonate, polytitanium titanium acetylacetonate, titanium octylene glycolate, titanium lactate ammonium salt, titanium lactate ethyl ester, titanium triethanolaminate and polyhydroxytitanium stearate.

The aluminum base coupling agents include, for example, acetalkoxyaluminum diisopropylate.

The silane base coupling agents include, for example, 3-aminopropyltriethoxysilane, 3-aminopropylmethyldiethoxysilane, 3-ureidopropyltriethoxysilane, 3-ureidopropyltrimethoxysilane, 3-aminopropyltrimethoxysilane, 3-aminopropyl-tris(2-methoxy-ethoxy-ethoxy)silane, N-methyl-3-aminopropyltrimethoxysilane, N-aminoethyl-3-aminopropyl-trimethoxysilane, diaminosilane, N-aminoethyl-3-aminopropylmethyldimethoxysilane, tri-aminopropyl-trimethoxysilane, 3-amino-4,5-dihydroimidazolepropyltriethoxysilane, 3-methacryloxypropyltrimethoxysilane, 3-glycidoxypropyltrimethoxysilane, 3-mercaptopropyltriethoxysilane, 3-mercaptopropyltrimethoxysilane, 3-mercaptopropylmethyldimethoxysilane, 3-chloropropyltriethoxysilane, 3-chloropropyltrimethoxysilane, 3-chloropropylmethyldimethoxysilane, 3-cyanopropyltriethoxysilane, vinyltrichlorosilane, vinyltriethoxysilane, vinyltrimethoxysilane, vinyltri(2-methoxyethoxy)silane, hexamethyldisilazane, N,O-bis(trimethylsilyl)acetamide, methyltrimethoxysilane, methyltriethoxysilane, ethyltrichlorosilane, n-propyltrimethoxysilane, isobutyltrimethoxysilane, amyltrichlorosilane, octyltriethoxysilane, vinyltris(β-methoxyethoxy)silane, γ-methacryloxypropyltrimethoxysilane, N-β-(aminoethyl)-γ-aminopropyltrimethoxysilane, γ-aminopropyltriethoxysilane, N-phenyl-γ-aminopropyltrimethoxysilane, phenyltrimethoxysilane, phenyltriethoxysilane, methyltri (methacryloyloxyethoxy)-silane, methyltri(glycidyloxy) silane, long chain alkyltriethoxysilane, tetramethyl silicate, tetraethyl silicate, vinyltris(2-methoxyethoxy)silane, 3-glycidoxypropylmethyldimethoxysilane, 2-(3,4-epoxycyclohexyl)ethyltrimethoxysilane, 3-methacryloxypropyltrimethoxysilane and γ-(2-aminoethyl) aminopropylmethyldimethoxysilane.

Further, they include N-β-(N-vinylbenzylaminoethyl)-γ-aminopropyltrimethoxysilane hydrochloride, vinyltriacetoxysilane, γ-anilinopropyltrimethoxysilane, octadecyldimethyl [3-(trimethyoxysilyl)propyl]ammonium chloride, γ-chloropropylmethyldichlorosilane, γ-methacryloxypropylmethyldimethoxysilane, trimethylmethoxysilane, trimethylethoxysilane, dimethyldimethoxysilane, dimethyldiethoxysilane, tetramethoxysilane, tetraethoxysilane, methyldimethoxysilane, methyldiethoxysilane, dimethylethoxysilane, dimethylvinylmethoxysilane, dimethylvinylethoxysilane, methylvinyldimethoxysilane, methylvinyldiethoxysilane, diphenyldimethoxysilane, diphenyldiethoxysilane, trimethylchlorosilane, dimethyldichlorosilane, methyltrichlorosilane, methyldichlorosilane, dimethylchlorosilane, dimethylvinylchlorosilane, methylvinyldichlorosilane, methylchlorodisilane, triphenylchlorosilane, methyldiphenylchlorosilane, diphenyldichlorosilane, methylphenyldichlorosilane, phenyltrichlorosilane, chloromethyldimethylchlorosilane, hexamethyldisilazane, cyclic silazane mixtures, N,N-bis(trimethylsilyl)urea, N-trimethylsilylacetamide, dimethyltrimethylsilylamine, diethyltrimethylsilylamine, trimethylsilylimidazole and N-trimethylsilylphenylurea.

The zirconium base coupling agents include zirconium butylate, zirconium acetylacetonate, acetylacetone zirconium butylate, zirconium lactate, stearic acid zirconium butylate, tetra(triethanolamine)zirconate and tetraisopropyl zirconate.

The zircoaluminate base coupling agents include product names A, C, C-1, F, M, M-1, S, APG, CPG, CPM, FPM, MPG and MPM each manufactured by Kusumoto Chemicals, Ltd. and tetrapropyl zircoaluminate.

The chromium base coupling agents include complexes of chromium methacrylate and chromium chloride.

The fluorine base coupling agents include trifluoropropyltrimethoxysilane and heptadecatrifluorodecyltrimethoxysilane.

The respective coupling agents described above can be used alone (one kind), and in addition thereto, they can be used in a mixture of plural (two or more kinds) coupling agents. Further, treatments using plural coupling agents can be carried out by stages.

Among the respective coupling agents described above, the titanate base coupling agents, the aluminum base coupling agents and the silane base coupling agents are particularly preferred from the viewpoint that excellent effects are shown when using them.

The objects of the surface treatment by the coupling agents in the first invention are not only inorganic pigments but also organic materials, for example, polymer fine particles of an organic polymer base and organic pigment particles. Materials in which the presence of active reaction sites (for example, a hydroxyl group) capable of carrying out coupling reaction with the coupling agents is indistinct are included as well in the above matrix particles. However, also when such matrix particles are subjected to coupling treatment with various coupling agents, the surface characteristics of the matrix particles can be changed by the coupling agents.

In respect to the reasons thereof, it is considered that even when a reaction-active group is not present, the coupling agents are physically adhered to the surface of the matrix particles or impregnated into the surface, whereby a change in the surface characteristics is realized. The treatment with the coupling agents referred to in the present invention includes a change in the surface characteristics described above.

In the present invention, the fine particles subjected to surface treatment for making lipophilic include, to be specific, particles obtained by treating ITT-2 $TiO_2$ CR-50 (titanium oxide treated a surface with a titan coupling agent, mean particle size: about 0.4 μm, manufactured by Nikko Chemicals Co., Ltd.), ITT-7 $TiO_2$ TTO-S-3 (fine particle titanium oxide treated a surface with a titan coupling agent, mean particle size: 0.05 to 0.1 μm, manufactured by Nikko Chemicals Co., Ltd.), KR-380 (titanium oxide treated a surface with a lipophilic surface treating agent, mean particle size: about 0.5 μm, manufactured by Titan Kogyo Co., Ltd.), KR-270 (titanium oxide treated a surface with a lipophilic surface treating agent, mean particle size: about 0.4 μm, manufactured by Titan Kogyo Co., Ltd.) and Tipaque CR-50 (titanium oxide having a hydrophilic surface, mean particle size: about 0.4 μm, manufactured by Ishihara Sangyo Kaisha, Ltd.) with coupling agents (for example, aluminum base coupling agents and silane base coupling agents).

FIG. 1 shows titanium oxide fine particle (ITT-2 $TiO_2$ CR-50) in which a titanium oxide surface is treated with a titan coupling agent.

In the first invention, the fine particles subjected to the surface treatment for making lipophilic described above are particularly preferably particles in which a surface functional group is an alkoxycarbonyl group from the viewpoints of enhancing dispersibility in the dispersion medium and fluidity. The particles in which a surface functional group is an alkoxycarbonyl group can be formed, for example, by eliminating an isopropyl group from isopropyl triisostearate titanium which is a titan coupling agent and allowing titanium to be bonded to a hydroxyl group on a particle surface.

Various fine particles described above having the structures described above are used as the fine particles of the first invention to the third invention, and fine particles having various particle sizes can be used in relation to a constituent display medium. Among them, the fine particles having a mean particle size of preferably 0.05 to 20 μm, particularly preferably 0.1 to 10 μm are used from the viewpoint of further enhancing the display characteristic, the memory property and the dispersion stability.

If the above mean particle size of the fine particles is less than 0.05 μm, an effect of diffusion caused by a Brownian motion of the fine particles is exerted to deteriorate the display characteristic, and coagulation tends to be strengthened, so that the dispersion system becomes instable. On the other hand, if the mean particle size exceeds 20 μm, the fine particles are liable to settle down, and it becomes a factor for deteriorating the display memory property and the dispersion stability.

In the present invention, the fine particles subjected to surface treatment for making lipophilic are contained in a proportion of preferably 10% or more, more preferably 20 to 100% based on the total amount of the fine particles from the viewpoint of exhibiting the effects of the present invention.

The total content of the fine particles is preferably 3 to 50%, more preferably 5 to 35% based on the total amount of the liquid for electrophoretic display.

If the above content of the fine particles is less than 3%, it is difficult to display the satisfactory contrast. On the other hand, if it exceeds 50%, interference between the fine particles is caused to reduce a moving speed and a response speed. Accordingly, both the ranges are not preferred.

When two kinds of black and white fine particles are used, those particles can be used with changing a proportion of the black and white fine particles in a range in which the total amount of both particles is 3 to 50% so that a black and white contrast can sufficiently be displayed.

Various dispersants, surfactants and high molecular surfactants which are conventionally used can be used as the dispersant in the first invention.

The specific examples of the surfactants used as the dispersant include the following nonionic surfactants, anionic surfactants, cationic surfactants, amphoteric surfactants and high molecular type surfactants, but they shall not be restricted to them.

The nonionic surfactants include, for example, polyoxyalkylene alkylphenol ethers such as polyoxyethylene nonylphenol ether, polyoxyethylene dinonylphenol ether, polyoxyethylene octylphenol ether, polyoxyethylene styrenated phenol, polyoxyethylene bisphenol A, polyoxyethylene nonylphenyl ether, polyoxyethylene octylphenyl ether and nonylphenol ethoxylate, polyoxyalkylene ethers such as polyoxyethylene castor oil, polyoxyalkylene block polymers, polyoxyethylene cetyl ether, polyoxyethylene lauryl ether, polyoxyethylene oleyl ether, polyoxyethylene stearyl ether and, glycols such as polyoxyalkylene glycols of a monool type, polyoxyalkylene glycols of a diol type, polyoxyalkylene glycols of a triol type, polyalkylene glycols of a monool base block type, polyalkylene glycols of a diol base block type and polyalkylene glycols of a random type, primary linear alcohol ethoxylate and secondary linear alcohol ethoxylate such as octylphenol ethoxylate, oleyl alcohol ethoxylate and lauryl alcohol ethoxylate, alkyl alcohol ethers such as polynuclear phenol ethoxylate, polyoxyalkylene alkyl esters such as polyoxyethylene rosin ester, polyoxyethylene lauryl ester, polyoxyethylene oleyl ester and polyoxyethylene stearyl ester, sorbitan fatty acid esters such as sorbitan monolaurate, sorbitan monopalmitate, sorbitan monostearate, sorbitan dilaurate, sorbitan dipalmitate, sorbitan distearate, sorbitan sesquilaurate, sorbitan sesquipalmitate, sorbitan sesquistearate, sorbitan monooleate, sorbitan dioleate, sorbitan sesquioleate and sorbitan trioleate, polyoxyethylene sorbitan esters such as polyoxyethylene sorbitan monolaurate, polyoxyethylene sorbitan monopalmitate, polyoxyethylene sorbitan monostearate, polyoxyethylene sorbitan dilaurate, polyoxyethylene sorbitan dipalmitate, polyoxyethylene sorbitan distearate, polyoxyethylene sorbitan sesquilaurate, polyoxyethylene sorbitan sesquipalmitate and polyoxyethylene sorbitan sesquistearate, fatty acid esters such as saturated fatty acid methyl ester, unsaturated fatty acid methyl ester, saturated fatty acid butyl ester, unsaturated fatty acid butyl ester, saturated fatty acid stearyl esters, unsaturated fatty acid stearyl esters, saturated fatty acid octyl esters, unsaturated fatty acid octyl esters, stearic acid polyethylene glycol esters, oleic acid polyethylene glycol esters and rosin polyethylene glycol esters, fatty acids such as stearic acid, oleic acid, palmitic acid, lauric acid and myristic acid and amide compounds of those fatty acids, higher fatty acid monoethanolamides and higher fatty acid diethanolamides such as lauric acid monoethanolamide and coconut fatty acid diethanolamide, amide compounds such as polyoxyethylene stearic amide, coconut diethanolamide (1-2 type/1-1 type) and alkylalkylolamide and alkanolamides.

Further, they include alkanolamines, primary amines represented by R—$NH_2$ (R is oleyl, octyl, dodecyl, tetradecyl, hexadecyl, octadecyl or the like or higher fatty acid obtained from coconut, beef tallow and soybean), secondary amines represented by R1R2-NH (R1 and R2 are oleyl, octyl, dodecyl, tetradecyl, hexadecyl, octadecyl or the like or higher fatty acid obtained from coconut, beef tallow and soybean), tertiary amines represented by R1R2R3-N (R1, R2 and R3 are oleyl, octyl, dodecyl, tetradecyl, hexadecyl, octadecyl or the like or higher fatty acid obtained from coconut, beef tallow and soybean), various synthetic higher alcohols and various natural higher alcohols.

The anionic surfactants include, for example, carboxylic acid salts such as specific fatty acid soaps and rosin soaps, salts of castor oil sulfuric acid ester, salts of alcohol sulfuric acid ester such as sodium salts of lauryl alcohol sulfuric acid ester, amine salts of lauryl alcohol sulfuric acid ester, sodium salts of natural alcohol sulfuric acid esters and sodium salts of higher alcohol sulfuric acid esters, salts of sulfuric acid esters such as amine salts of lauryl alcohol ether sulfuric acid ester, sodium salts of lauryl alcohol ether sulfuric acid ester, amine salts of synthetic higher alcohol ether sulfuric acid esters, sodium salts of synthetic higher alcohol ether sulfuric acid esters, amine salts of alkyl polyether sulfuric acid esters, sodium salts of alkyl polyether sulfuric acid esters, amine salts of natural alcohol EO (ethylene oxide) adduct sulfuric acid esters, sodium salts of natural alcohol EO (ethylene oxide) adduct sulfuric acid esters, amine salts of synthetic alcohol EO (ethylene oxide) adduct sulfuric acid esters, sodium salts of synthetic alcohol EO (ethylene oxide) adduct sulfuric acid esters, amine salts of alkylphenol EO (ethylene oxide) adduct sulfuric acid esters, sodium salts of alkylphenol EO (ethylene oxide) adduct sulfuric acid esters, amine salts of polyoxyethylene nonylphenyl ether sulfuric acid esters, sodium salts of polyoxyethylene nonylphenyl ether sulfuric acid esters, amine salts of polyoxyethylene polycyclic phenyl ether sulfuric acid esters and sodium salts of polyoxyethylene polycyclic phenyl ether sulfuric acid esters, sulfonic acid salts such as various alkylaryl sulfonic acid amine salts, various alkylaryl sulfonic acid sodium salts, naphthalenesulfonic acid amine salts, naphthalenesulfonic acid sodium salts, various alkylbenzenesulfonic acid amine salts, various alkylbenzenesulfonic acid sodium salts and naphthalenesulfonic acid condensation products, salts of polyoxyalkylene base compound sulfonic acids such as amine salts of polyoxyalkylene nonylphenyl ether sulfonic acids, sodium salts of polyoxyethylene nonylphenyl ether sulfonic acids, amine salts of polyoxyethylene specific aryl ether sulfonic acids, sodium salts of polyoxyethylene specific aryl ether sulfonic acids, amine salts of polyoxyalkylene tridecylphenyl ether sulfonic acids, sodium salts of polyoxyethylene tridecylphenyl ether sulfonic acids, amine salts of polyoxyethylene alkyl ether sulfonic acids and sodium salts of polyoxyethylene alkyl ether sulfonic acids, salts of sulfosuccinic acid esters such as amine salts of dialkyl sulfosuccinates, sodium salts of dialkyl sulfosuccinates, amine salts of polycyclic phenyl polyethoxysulfosuccinates, sodium salts of polycyclic phenyl polyethoxysulfosuccinates, amine salts of polyoxyalkylene alkyl ether sulfosuccinic acid monoesters and sodium salts of polyoxyalkylene alkyl ether sulfosuccinic acid monoesters, phosphoric acid esters such as alkylphosphoric acid esters, alkoxyalkylphosphoric acid esters, higher alcohol phosphoric acid esters, alkylphenol type phosphoric acid esters, aromatic phosphoric acid esters, polyoxyalkylene alkyl ether phosphoric acid esters and polyoxyalkylene alkylaryl ether phosphoric acid esters, and phosphoric acid salts.

The cationic surfactants include, for example, alkyltrimethylamine base quaternary ammonium salts represented by R—N(CH$_3$)$_3$X (R is stearyl, cetyl, lauryl, oleyl, dodecyl, coconut, soybean, beef tallow or the like, and X is halogen, amine or the like), quaternary ammonium salts such as tetramethylamine base salts and tetrabutylamine base salts, acetic acid salts represented by (RNH$_3$)(CH$_3$COO) (R is stearyl, cetyl, lauryl, oleyl, dodecyl, coconut, soybean, beef tallow or the like), benzylamine base quaternary ammonium salts such as lauryldimethylbenzylammonium salts (halogen, amine salts and the like), stearyldimethylbenzylammonium salts (halogen, amine salts and the like) and dodecyldimethylbenzylammonium salts (halogen, amine salts and the like) and polyoxyalkylene base quaternary ammonium salts represented by R(CH$_3$)N(C$_2$H$_4$O)mH(C$_2$H$_{40}$)nH.X (R is stearyl, cetyl, lauryl, oleyl, dodecyl, coconut, soybean, beef tallow or the like, and X is halogen, amine or the like).

The amphoteric surfactants include, for example, various betaine type surfactants, various imidazoline type surfactants, β-alanine type surfactants and polyoctylpolyaminoethylglycine hydrochloride.

In the present invention, the high molecular type surfactants which can be used are polymers having a large molecular weight (number average molecular weight, hereinafter the same shall apply) instead of those having a small molecular weight of several hundred, and they include compounds including low molecular weight polymers having a molecular weight of 10000 or less which are usually called oligomers in addition to polymers having a molecular weight of about 10000 or more which are usually called macromolecules (polymers).

The following anionic high molecular type surfactants, cationic high molecular type surfactants and nonionic high molecular type surfactants can be given as the high molecular type surfactants.

The anionic high molecular type surfactants include, for example, styrene-maleic anhydride copolymers, olefin-maleic anhydride copolymers, naphthalenesulfonic acid salt condensation products, formalin condensation products of naphthalenesulfonic acid salts, poly(sodium acrylate), polycarboxylic acid type anionic surfactants, polyacrylamide-partially hydrolyzed products, acrylamide-sodium acrylate copolymers and sodium alginate.

The cationic high molecular type surfactants include, for example, polyethyleneimine, polyvinylimidazolidone, aminoalkyl(meth)acrylate-acrylamide copolymers, acrylamide Mannich denatured products and chitosan.

The nonionic high molecular type surfactants include, for example, polyvinyl alcohol, copolymers of polyethylene ether ester, polyacrylamide, polycarboxylic acid base compounds, oligomers of hydroxyfatty acids, denatured products of oligomer of hydroxyfatty acids, polyhydroxyfatty acids, polyhydroxyfatty acid-denatured products, poly-1,2-hydroxystearic acid, N-polyoxyalkylenepolyalkylenepolyamine and starch.

In the dispersant of the present invention, particularly preferably used are nonionic or anionic surfactants and nonionic or anionic high molecular type surfactants which are less liable to exert an adverse effect on positive or negative electrification of the particle surface and which are less liable to exert an adverse effect when encapsulating the liquid for electrophoretic display into microcapsules.

The above dispersants can be used alone or in combination of two or more kinds thereof. A content thereof is suitably determined according to the fine particles used and the kind of the solvent, and it is preferably 0.01 to 50.0%, more preferably 1 to 30% based on the total amount of the liquid for electrophoretic display.

If a content of the dispersant is less than 0.01%, it becomes difficult to secure satisfactory dispersion stability of the dispersion system. On the other hand, if it exceeds 50.0%, conductivity of the dispersion liquid medium grows high, and a viscosity of the dispersion system is raised, so that an adverse effect is exerted on the display characteristics. Accordingly, both ranges are not preferred.

In the present invention, those of various types which have so far been used for electrophoretic display can be used as the dispersion liquid medium.

To be specific, they include aromatic hydrocarbons such as benzene, alkylbenzene derivatives such as toluene, xylene, ethylbenzene and dodecylbenzene, diarylalkane derivatives such as phenylxylylethane, 1,1-ditolylethane, 1,2-ditolylethane and 1,2-bis(3,4-dimethylphenylethane) (BDMF), alkylnaphthalene derivatives such as diisopropylnaphthane, alkylbiphenyl derivatives such as monoisopropylbiphenyl, isopropylbiphenyl and isoamylbiphenyl, terphenyl derivatives which are hydrogenated in various proportions, triaryldimethane derivatives such as dibenzyltoluene, benzylnaphthalene derivatives, phenylene oxide derivatives, diarylalkylene derivatives, arylindane derivatives, polychlorinated biphenyl derivatives and naphthene base hydrocarbons.

Further, they include aliphatic hydrocarbons such as hexane, cyclohexane, kerosene, isoper and paraffin base hydrocarbons, halogenated hydrocarbons such as chloroform, trichloroethylene, tetrachloroethylene, trifluoroethylene, tetrafluoroethylene, dichloromethane and ethyl bromide, phosphoric acid esters such as tricresyl phosphate, trioctyl phosphate, octyldiphenyl phosphate and tricyclohexyl phosphate, phthalic acid esters such as dibutyl phthalate, dioctyl phthalate, dilauryl phthalate and dicyclohexyl phthalate, carboxylic acid esters such as butyl oleate, diethylene glycol dibenzoate, dioctyl sebacate, dibutyl sebacate, dibutyl adipate, trioctyl trimellitate, acetyltriethyl citrate, octyl maleate, dibutyl maleate and ethyl acetate, chlorinated paraffin and N,N-dibutyl-2-butoxy-5-tertiary octylaniline, but they shall not be restricted thereto.

Further, in the present invention, the dispersion liquid media can be used alone or in a mixture of two or more kinds thereof. Particularly, a solvent having a low dielectric constant (5.0 or lower) is preferably used as the dispersion liquid medium, and it is preferably selected so that it has the same specific gravity as those of the fine particles.

A content of the dispersion liquid media is suitably determined according to the fine particles used and the kind of the dispersant, and it is preferably 25 to 85%, more preferably 30 to 60% based on the total amount of the liquid for electrophoretic display.

If a content of the dispersion liquid medium is less than 25%, a viscosity of the liquid grows high, and the response speed is lowered. On the other hand, if it exceeds 85%, the satisfactory contrast can not be displayed. Accordingly, both ranges are not preferred.

Further, in the present invention, the dispersion liquid media described above which are colored by dissolving therein various oil-soluble dyes can be used. In this case, the following ones can be given as the dyes which can be used, but the present invention shall not be restricted to them.

The dyes which can be used include, for example, spirit black (SS, SSBB, AB), nigrosine bases (SA, SAP, SAPL, EE, EEL, EX, EXBP, EB), oil yellow (105, 107, 129, 3G, GGS), oil orange (201, PS, PR), fast orange, oil red (5B, PR, OG), oil scarlet, oil pink 312, oil violet #730, macrorex blue RR, Sumiplast Green G, oil brown (GR, 416), Sudan Black X60, oil green (502, BG), oil blue (613, 2N, BOS), oil black (HBE, 860, BS), Valifast Yellow (1101, 1105, 3108, 4120), Valifast Orange (3209, 3210), Valifast Red (1306, 1355, 2303, 3304, 3306, 3320), Valifast Pink 2310N, Valifast Brown (2402, 3405), Valifast Blue (3405, 1501, 1603, 1605, 1607, 2606, 2610), Valifast Violet (1701, 1702) and Valifast Black (1802, 1807, 3804, 3810, 3820, 3830) as representative ones.

The above dyes are preferably used by selecting the colors which can display the contrast against the fine particles used, and two or more kinds thereof can be used to control the color.

The liquid for electrophoretic display according to the first invention comprises at least the alkylpolyetheramine having the structural unit represented by Formula (I) described above, one or more kinds of the fine particles described above, the dispersant and the dispersion liquid medium, wherein the fine particles contain fine particles subjected to surface treatment for making lipophilic, and it can contain the suitable amounts of optional components used for a liquid for electrophoretic display as long as the effects of the present invention are not damaged.

The optional components which can be used include UV absorbers, antioxidants, light stabilizers, heat stabilizers and fungicides.

The liquid for electrophoretic display according to the first invention can be prepared by mixing and stirring at least the alkylpolyetheramine having the structural unit represented by Formula (I) described above, one or more kinds of the fine particles described above containing the fine particles subjected to surface treatment for making lipophilic, the dispersant and the dispersion liquid medium and then subjecting the mixture to various dispersion treatment by a medialess dispersion method such as supersonic dispersion and a dispersion method using media of a wet bead mill. Further, classification treatment making use of a principle of centrifugal separation and a particle size-controlling by a filtration method can be carried out, if necessary, in order to control a particle size of the fine particles.

In the liquid for electrophoretic display thus constituted according to the first invention, used is the liquid which comprises at least the alkylpolyetheramine having the structural unit represented by Formula (I) described above, one or more kinds of the fine particles, the dispersant and the dispersion liquid medium and in which the particles containing the fine particles subjected to surface treatment for making lipophilic are used for the fine particles described above, whereby the liquid which has a high contrast on a display face and can display a contrast with a high reliability even in repetitive display and which is excellent in a response can be provided.

The liquid for electrophoretic display according to the second invention comprises at least the alkylpolyetheramine having the structural unit represented by Formula (I) described above, the polyoxyethylene oxypropylene block polymer having the structural unit represented by Formula (II) described above, one or more kinds of the fine particles and the dispersion liquid medium:

$$OH(C_2H_4O)p(C_3H_6O)qH \qquad (II)$$

in Formula (II) described above, p and q are positive numbers.

The polyoxyethylene oxypropylene block polymer used in the second invention improves dispersibility of the fine particles and aging stability of the liquid for electrophoretic display, and it may be any one as long as it has the structure represented by Formula (II) described above. The polyoxyethylene oxypropylene block polymer having an average molecular weight of 1000 to 4000 is preferred from the viewpoint of solubility in a solvent having a low dielectric constant. The polyoxyethylene oxypropylene block polymer having an ethylene oxide amount of 50% by weight or less is more preferred, and the polyoxyethylene oxypropylene block polymer having an ethylene oxide amount of 5 to 30% by weight is particularly preferred.

The polyoxyethylene oxypropylene block polymer which can specifically be used includes at least one kind (one kind or two or more kinds) of Pronon 102 (average molecular weight: 1250, ethylene oxide amount: 20% by weight), Pronon 104 (average molecular weight: 1670, ethylene oxide amount: 40% by weight), Pronon 201 (average molecular weight: 2220, ethylene oxide amount: 10% by weight), Pronon 204 (average molecular weight: 3300, ethylene oxide amount: 40% by weight) and Pronon 208 (average molecular weight: 10000, ethylene oxide amount: 80% by weight) each manufactured by NOF Corporation. However, it shall not be restricted to them as long as it is dissolved in the dispersion medium.

A content of the polyoxyethylene oxypropylene block polymers is preferably 0.01 to 30%, more preferably 0.01 to 10% based on the total amount of the display liquid.

If a content of the polyoxyethylene oxypropylene block polymers is less than 0.01%, the fine particles are reduced in dispersibility, and the liquid for electrophoretic display is deteriorated in aging stability. On the other hand, if it exceeds 30%, an adverse effect is exerted on the display performances such as the contrast. Accordingly, both ranges are not preferred.

In the liquid for electrophoretic display according to the second invention, the polyoxyethylene oxypropylene block polymer having the characteristics described above is used in comparison with the liquid for electrophoretic display according to the first invention described above, so that one or more kinds of the fine particles which are not subjected to the surface treatment for making lipophilic can be used as well. Further, the effects of the present invention can be exhibited without using the dispersant.

The respective components such as the alkylpolyetheramine having the structural unit represented by Formula (I) described above, one or more kinds of the fine particles, the dispersion liquid medium, the dispersant, the surfactant, the high molecular type surfactant and the colorant (dye) excluding the polyoxyethylene oxypropylene block polymer having the characteristics described above which is used for the liquid for electrophoretic display according to the second invention and the respective contents thereof are the same as the respective components and the contents thereof used for the liquid for electrophoretic display according to the first invention described above, and therefore the explanations thereof shall be omitted. In the second invention, the fine particles subjected to the surface treatment for making lipophilic may be used as the preferred embodiment, and the dispersant may be added.

The liquid for electrophoretic display according to the second invention comprises at least the alkylpolyetheramine having the structural unit represented by Formula (I) described above, the polyoxyethylene oxypropylene block polymer having the structural unit represented by Formula (II) described above, one or more kinds of the fine particles and the dispersion liquid medium, and it may contain the suitable amounts of optional components used for a liquid for electrophoretic display as long as the effects of the present invention are not damaged.

The optional components which can be used include UV absorbers, antioxidants, light stabilizers, heat stabilizers and fungicides.

The liquid for electrophoretic display according to the second invention can be prepared by mixing and stirring at least the alkylpolyetheramine having the structural unit represented by Formula (I) described above, the polyoxyethylene oxypropylene block polymer having the structural unit represented by Formula (II) described above, one or more kinds of the fine particles and the dispersion liquid medium and then subjecting the mixture to various dispersion treatment by a medialess dispersion method such as supersonic dispersion and a dispersion method using a media of a wet bead mill. Further, classification treatment making use of a principle of centrifugal separation and particle size-controlling by a filtration method may be carried out, if necessary, in order to control a particle size of the fine particles.

In the liquid for electrophoretic display thus constituted according to the second invention, used is the liquid comprising at least the alkylpolyetheramine having the structural unit represented by Formula (I) described above, the polyoxyethylene oxypropylene block polymer having the structural unit represented by Formula (II) described above, one or more kinds of the fine particles and the dispersion liquid medium, whereby the liquid which displays a high contrast on a display face and can display the contrast with high reliability even in repetitive display and which is excellent in a response can be provided.

The liquid for electrophoretic display according to the third invention is characterized by comprising at least the alkylpolyetheramine having the structural unit represented by Formula (I) described above, the polyoxyethylene oxypropylene block polymer having the structural unit represented by Formula (II) described above, the acetylene derivative having the structural unit represented by the following Formula (III), one or more kinds of the fine particles and the dispersion liquid medium:

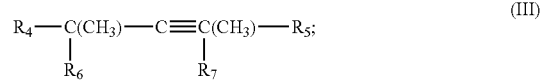

$$R_4-C(CH_3)-C\equiv C(CH_3)-R_5; \quad (III)$$
$$\underset{R_6}{|} \quad \underset{R_7}{|}$$

in Formula (III) described above, $R_4$ and $R_5$ are a saturated hydrocarbon group or an unsaturated hydrocarbon group; $R_6$ is $OCH_2CH(CH_3)OH$ or $(OCH_2CH_2)m-OH$; $R_7$ is $OCH_2CH(CH_3)OH$ or $(OCH_2CH_2)n-OH$; m and n are positive numbers; m and n are 0 or a positive number; and $R_6$ and $R_7$ may be the same or different.

The acetylene derivative used in the third invention improves durability and reliability of the liquid for electrophoretic display, and it may be any one as long as it has the structure represented by Formula (III) described above. It includes, for example, acetylene glycol derivatives ($R_4$ and $R_5$ are an isobutyl group, and $R_6$ and $R_7$ are a —OH group (m and n are 0)), ethylene oxide adducts of acetylene glycol derivatives ($R_4$ and $R_5$ are an isobutyl group; $R_6$ is $(OCH_2CH_2)m$-OH; $R_7$ is $(OCH_2CH_2)n$-OH; m and n are positive numbers), propylene oxide adducts of acetylene glycol derivatives ($R_4$ and $R_5$ are an isobutyl group, and $R_6$ and $R_7$ are $OCH_2CH(CH_3)$—) and mixtures of the derivatives and organic solvents (ethylene glycol, dipropylene glycol monomethyl ether and the like). They can be used alone (one kind) or in a mixture of two or more kinds thereof.

To be specific (including cases in which they are used in examples described later), capable of being given are commercially available Surfynol 104 (acetylene glycol derivative; $R_4$ and $R_5$ are an isobutyl group; $R_6$ and $R_7$ are a —OH group (m and n are 0); and HLB is 4), Surfynol 104E (mixture of Surfynol 104 (50% by weight) and ethylene glycol (50% by weight), HLB: 4), Surfynol 104DPM (mixture of Surfynol 104 (50% by weight) and dipropylene glycol monomethyl ether (50% by weight), HLB: 4), Surfynol 420 (ethylene oxide (20% by weight) adduct of Surfynol 104, HLB: 4), Surfynol DF-110D (acetylene diol, HLB: 4) and Olfin B (acetylene alcohol, HLB: 10 or less) (all manufactured by Nissin Chemical Industry Co., Ltd.).

Preferred is the acetylene derivative represented by Formula (III) described above in which HLB is preferably 10 or less, more preferably 2 to 5. Use of the acetylene derivative having HLB of 10 or less further enhances the affinity of the fine particles to the liquid for electrophoretic display and makes the repetitive display characteristics better.

When using acetylene derivatives which are not included in those represented by Formula (III) described above, the affinity to the liquid for electrophoretic display runs short, and the satisfactory effect of improving the repetitive display characteristics is not exhibited. Accordingly, they are not preferred.

A content of the above acetylene derivatives is preferably 0.01 to 10%, more preferably 0.05 to 5.0% based on the total amount of the display liquid.

If a content of the acetylene derivatives is less than 0.01%, the satisfactory effect of improving the repetitive display characteristics is not exhibited. On the other hand, if it exceeds 10%, a rise in a viscosity of the liquid for electrophoretic display is brought about, and an adverse effect is exerted on the electrophoretic characteristics in a certain case.

The liquid for electrophoretic display according to the third invention further comprises the acetylene derivative having the characteristics described above in comparison with the liquid for electrophoretic display according to the second invention.

The respective components such as the alkylpolyetheramine having the structural unit represented by Formula (I) described above, the polyoxyethylene oxypropylene block polymer having the structural unit represented by Formula (II) described above, one or more kinds of the fine particles, the dispersion liquid medium, the dispersant, the surfactant, the high molecular type surfactant and the colorant (dye) excluding the acetylene derivative having the characteristics described above which is used for the liquid for electrophoretic display according to the third invention and the respective contents thereof are the same as the respective components and the contents thereof used for the liquids for electrophoretic display according to the first invention and the second invention each described above, and therefore the explanations thereof shall be omitted. Also in the third invention, the fine particles which are subjected to the surface treatment for making lipophilic may be used as the preferred embodiment, and the dispersant may be added.

The liquid for electrophoretic display according to the third invention comprises at least the alkylpolyetheramine having the structural unit represented by Formula (I) described above, the polyoxyethylene oxypropylene block polymer having the structural unit represented by Formula (II) described above, the acetylene derivative having the structural unit represented by Formula (III) described above, one or more kinds of the fine particles and the dispersion liquid medium, and it may contain the suitable amounts of optional components used for a liquid for electrophoretic display as long as the effects of the present invention are not damaged.

The optional components which can be used include UV absorbers, antioxidants, light stabilizers, heat stabilizers and fungicides.

The liquid for electrophoretic display according to the third invention can be prepared by mixing and stirring at least the alkylpolyetheramine having the structural unit represented by Formula (I) described above, the polyoxyethylene oxypropylene block polymer having the structural unit represented by Formula (II) described above, the acetylene derivative having the structural unit represented by Formula (III) described above, one or more kinds of the fine particles and the dispersion liquid medium and then subjecting the mixture to various dispersion treatment by a medialess dispersion method such as supersonic dispersion and a dispersion method using a media of a wet bead mill. Further, classification treatment making use of a principle of centrifugal separation and particle size-controlling by a filtration method can be carried out, if necessary, in order to control a particle size of the fine particles.

In the liquid for electrophoretic display thus constituted according to the third invention, used is the liquid comprising at least the alkylpolyetheramine having the structural unit represented by Formula (I) described above, the polyoxyethylene oxypropylene block polymer having the structural unit represented by Formula (II) described above, the acetylene derivative having the structural unit represented by Formula (III) described above, one or more kinds of the fine particles and the dispersion liquid medium, whereby the liquid which displays a high contrast on a display face and can display the contrast with high reliability even in repetitive display and which is excellent in a response can be provided.

Next, the medium for electrophoretic display according to the present invention is characterized by that any one of the liquids for electrophoretic display prepared in the first invention to the third invention is encapsulated into each independent structures of microcapsules or cells.

Figure 2:
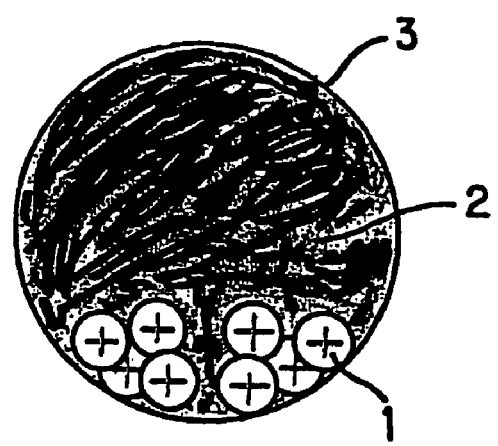
FIG. 2 is a drawing schematically showing an embodiment in which the liquid for electrophoretic display of a single particle type is filled into a structure comprising a microcapsule.
Figure 3:
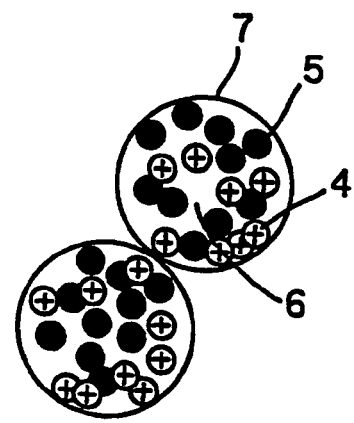
FIG. 3 is a drawing schematically showing an embodiment in which the liquid for electrophoretic display of a double particle type is filled into a structure comprising a microcapsule.

FIG. 2 and FIG. 3 are the embodiments of using a liquid of a single particle type or a double particle type in which the liquid for electrophoretic display is encapsulated into a structure comprising microcapsules.

In FIG. 2, a liquid for electrophoretic display prepared by dispersing a prescribed amount of titanium oxide particles or titanium oxide particles subjected to treatment for making lipophilic in a solution colored to black with an oil-soluble dye is micro-encapsulated by a urea-formaldehyde resin, wherein an illustrated symbol 1 is a positively electrified (titanium oxide) white particle; 2 is a black solvent; and 3 is a capsule wall.

In FIG. 3, a liquid for electrophoretic display prepared by dispersing the prescribed amounts of titanium oxide particles or titanium oxide particles subjected to treatment for making lipophilic and cross-linked acryl base polymer particles including carbon black in a dispersion medium is micro-encapsulated by a urea-formaldehyde resin, wherein an illustrated symbol 4 is a positively electrified (titanium oxide) white particle; 5 is a non-electrified black particle (cross-linked acryl base polymer particle including carbon black); 6 is a non-colored solvent; and 7 is a capsule wall.

Figure 4:
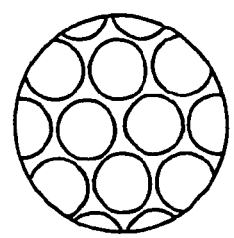
FIG. 4 is a drawing schematically showing one example of an embodiment in which the liquid for electrophoretic display is filled into a structure comprising a cell.
Figure 5:
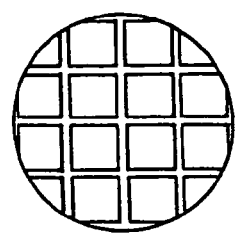
FIG. 5 is a drawing schematically showing another example of the embodiment in which the liquid for electrophoretic display is filled into a structure comprising a cell.
Figure 6:
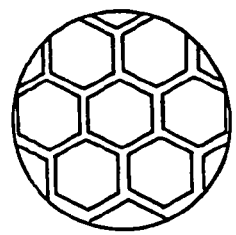
FIG. 6 is a drawing schematically showing the other example of the embodiment in which the liquid for electrophoretic display is filled into a structure comprising a cell.
Figure 7:
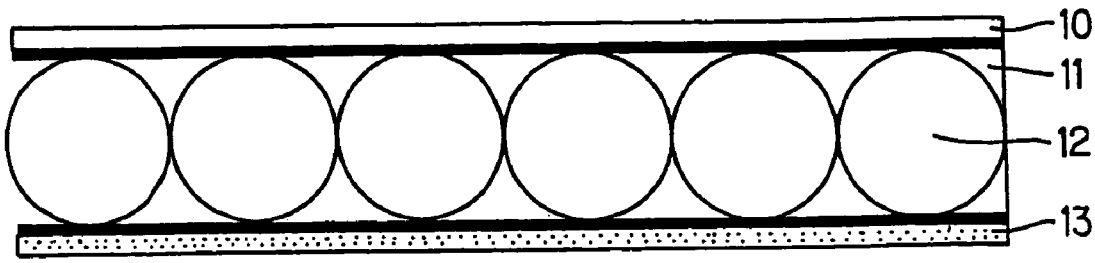
FIG. 7 is a cross-sectional drawing schematically showing one example of an embodiment in which microcapsules are disposed between counter electrodes.
Figure 8:
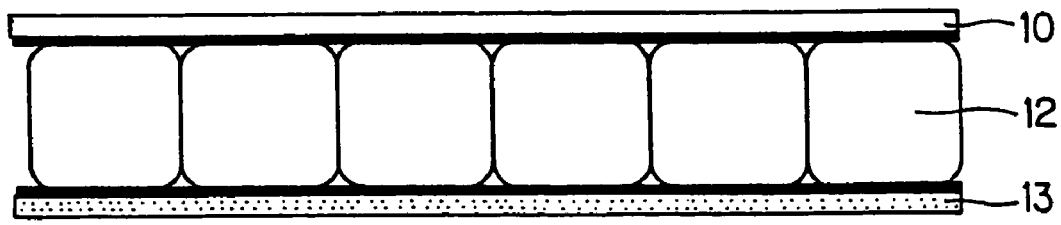
FIG. 8 is a cross-sectional drawing schematically showing one example of an embodiment in which a cell structure sheet is disposed between counter electrodes.

FIG. 4 to FIG. 6 are the respective embodiments in which the liquid for electrophoretic display is filled into a structure comprising a cell, and the respective patterns of the cells are schematically shown. Further, FIG. 7 to FIG. 9 each schematically show cross-sectional drawings in a case where a microcapsule and a cell structure sheet are arranged between counter electrodes, wherein in FIG. 7 to FIG. 9, an illustrated symbol 10 is a transparent electrode; 11 is a binder resin layer; 12 is a microcapsule; 13 is a counter substrate; and 14 is a cell-forming sheet (the same shall apply to FIG. 10 and FIG. 11).

The microcapsule used for the medium for electrophoretic display according to the present invention can be prepared by an in-situ polymerization method, an interfacial polymerization method and a coacervation method which are usually used. In this case, a wall material for the microcapsule includes polyurethanes, polyureas, polyurea-polyurethanes, urea-formaldehyde resins, melamine-formaldehyde resins, polyamides, polyesters, polysulfoneamides, polycarbonates, polysulfinates, epoxy resins, acrylic acid ester resins, methacrylic acid ester resins, vinyl acetate resins and gelatin.

Further, the microcapsules used for the display particles for electrophoretic display according to the present invention have preferably a particle size of 10 to 200 μm.

If a particle size of the microcapsules is less than 10 μm, the inconvenience that the contrast is not sufficiently obtained is involved therein. On the other hand, if it exceeds 200 μm, the inconvenience that the satisfactory response speed is not obtained without raising the applied voltage. Accordingly, both ranges are not preferred.

A particle size of the microcapsules falls preferably in certain distribution as much as possible. If it is not uniform, uneven display is caused, and the display characteristics are lowered.

The microcapsules used for the medium for electrophoretic display according to the present invention have preferably flexibility so that the microcapsules are arranged in a high density in order to prevent gaps from being generated therebetween when installing them between the counter electrodes disposed in the display device.

This reduces very much a proportion of a region which does not contribute to display, and the contrast grows sharp. Further, the microcapsules are brought into face contact with the counter electrode, and the uneven display is less liable to be generated, so that the electrophoretic display device having a display characteristic of high quality is obtained.

The microcapsule having flexibility results in being increased in mechanical strength and improved as well in characteristics when arranging the microcapsules on the electrodes for display by a coating method.

A water dispersion type resin base binder and a solvent dissolving type resin base binder can be used for a coating liquid for coating the microcapsules used for the medium for electrophoretic display according to the present invention on the substrate electrode. It is preferable that dispersibility of the microcapsules in the coating liquid is good in order to evenly arrange the microcapsules when coating them on the substrate.

Further, the microcapsules are preferably brought into even contact with each other at a drying step, and the microcapsules are preferably not inhibited from being brought into face contact with each other at a final drying step.

In the medium for electrophoretic display according to the present invention in which the liquid for electrophoretic display is filled into the structure comprising the independent and divided cell as shown in FIG. 4 to FIG. 6, an electrode part and a cell part which are brought into contact with the liquid for electrophoretic display in the structure of the cell filled with the liquid for electrophoretic display are preferably subjected to hydrophilization treatment selected from ozone treatment, plasma treatment, corona treatment, UV itoro treatment, sputtering treatment, polymer layer-forming treatment, inorganic layer-forming treatment and organic or inorganic hybrid layer-forming treatment from the viewpoint of controlling an affinity with the electrophoretic particles in the liquid.

In the ozone treatment, the surface of a cell sheet is exposed to ozone to be brought into contact with ozone molecules for the purpose of introducing a functional group (hydrophilic group) such as a hydroxyperoxy group, a hydroxyl group and a carbonyl group, whereby the hydrophilization treatment is carried out. The exposing method includes a method in which it is held in atmosphere in which ozone is present for prescribed time and a method in which it is exposed in ozone flow for prescribed time, but it shall not specifically be restricted.

The plasma treatment is carried out by putting the cell sheet described above in a vessel containing air, oxygen, nitrogen, carbon dioxide, argon and neon to expose to plasma produced by glow discharge, and it has the purpose of introducing a functional group (hydrophilic group) such as a carboxylic acid group, a carbonyl group and an amino group each containing oxygen or nitrogen into a cell sheet surface part. A discharge system for generating plasma includes direct current discharge, low frequency discharge, radiofrequency wave discharge and microwave discharge, but it shall not specifically be restricted to them. Air plasma treatment and oxygen plasma treatment are preferred from the viewpoint of introducing a hydrophilic functional group containing an oxygen atom.

In the corona treatment, the cell sheet described above is allowed to pass in an electric field in which corona discharge is generated, whereby an inside surface part of the cell sheet can be subjected to hydrophilization treatment.

In the UV itoro treatment, carried out is treatment (silicification flame treatment, titanium oxidation flame treatment and aluminum oxidation flame treatment) in which blown onto the cell sheet described above is flame of fuel gas containing at least one modifier compound selected from the group consisting of alkylsilane compounds, alkoxysilane compounds, alkyltitanium compounds, alkoxytitanium compounds, alkylaluminum compounds and alkoxyaluminum compounds, preferably at least one of modifier compounds having a boiling point of 10 to 100° C., whereby an inside surface part of the cell sheet can be subjected to hydrophilization treatment. A flame temperature in carrying out the blowing treatment is 500 to 1500° C., and the treating time is 0.1 to 100 seconds.

Further, the electrode part and the cell part which are brought into contact with the liquid for electrophoretic display can be subjected as well to hydrophilization treatment by sputtering treatment, polymer layer-forming treatment, inorganic layer-forming treatment and organic or inorganic hybrid layer-forming treatment.

In the medium for electrophoretic display according to the present invention, a volume of the independent and divided cell is preferably $1\times10^{-9}$ to $1\times10^{-3}$ ml in the medium in which the structure comprising the independent and divided cell is filled, as shown in FIG. 4 to FIG. 6, with the liquid for electrophoretic display.

If this volume is less than $1\times10^{-9}$ ml, deterioration in the display contrast is liable to be brought about. On the other hand, if it exceeds $1\times10^{-3}$ ml, coagulation is liable to be caused in an inside of the cells to bring about failures such as uneven display.

Also, in the medium for electrophoretic display in which the liquid for electrophoretic display thus constituted according to the present invention is encapsulated into microcapsules or cells, the contrast on the display face is sharp, and the contrast can be displayed with high reliability even in repetitive display. In addition, the characteristics in which a response is excellent are realized.

Further, the electrophoretic device of the present invention is characterized by having a pair of substrates on at least one of which electrodes having a light transmitting property are formed and the medium for electrophoretic display having the structure described above between the substrates.

The electrophoretic display device of the present invention includes, for example, devices having the following forms of a) to f), but it shall not be restricted to them.

a) An electrophoretic display device in which a pair of base materials for display equipped with an electrode on one face of a substrate are arranged via spacers so that the electrode faces are oppositely disposed to form a space and in which the liquid for electrophoretic display according to the present invention is filled into the space and at least one of the base materials for display is a transparent substrate provided on one face thereof with a transparent electrode.

b) An electrophoretic display device in which an insulating film and a base material for display equipped with an electrode on one face of a substrate are oppositely disposed to via spacers to form a space and in which the liquid for electrophoretic display according to the present invention is filled into the space and at least one of the base material for display and the insulating film is transparent.

c) An electrophoretic display device in which a pair of base materials for display equipped with an electrode on one face of a substrate are arranged via spacers so that the electrode faces are oppositely disposed to form a space and in which the display particles for electrophoretic display according to the present invention are filled into the space and at least one of the base materials for display is a transparent substrate provided on one face thereof with a transparent electrode.

d) An electrophoretic display device in which an insulating film and a base material for display equipped with an electrode on one face of a substrate are oppositely disposed via spacers to form a space and in which the display particles for electrophoretic display according to the present invention are filled into the space and at least one of the base material for display and the insulating film is transparent.

e) An electrophoretic display device in which the medium for electrophoretic display according to the present invention is coated together with a binder on a base material for display equipped with a transparent or opaque electrode on one face of a transparent or opaque substrate.

f) An electrophoretic display device in which a pair of base materials for display equipped with an electrode on one face of a substrate are arranged via spacers so that the electrode faces are oppositely disposed to form a space and in which the liquid for electrophoretic display according to the present invention is filled into the space divided into independent cells by lattice-shaped walls and at least one of the base materials for display is a transparent substrate provided on one face thereof with a transparent electrode.

In this display device, the independent and divided cell has preferably a volume of $1 \times 10^{-9}$ to $1 \times 10^{-3}$ ml.

Figure 10:
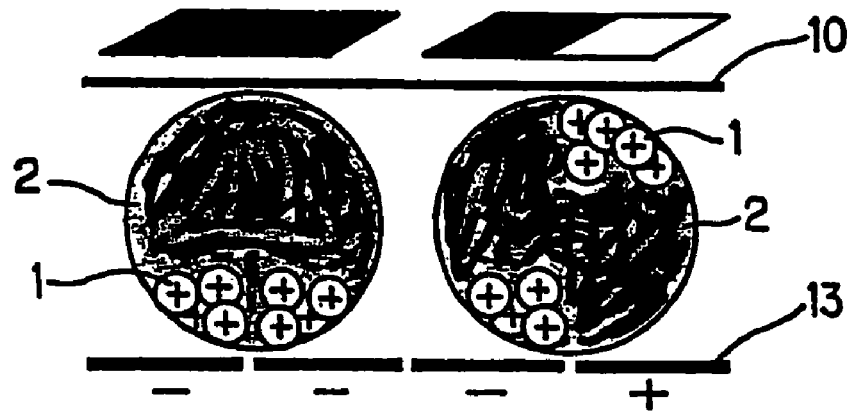
FIG. 10 is a schematic drawing of an electrophoretic display device using a display medium prepared by filling a structure comprising microcapsules with the liquid for electrophoretic display of a single particle type.
Figure 11:
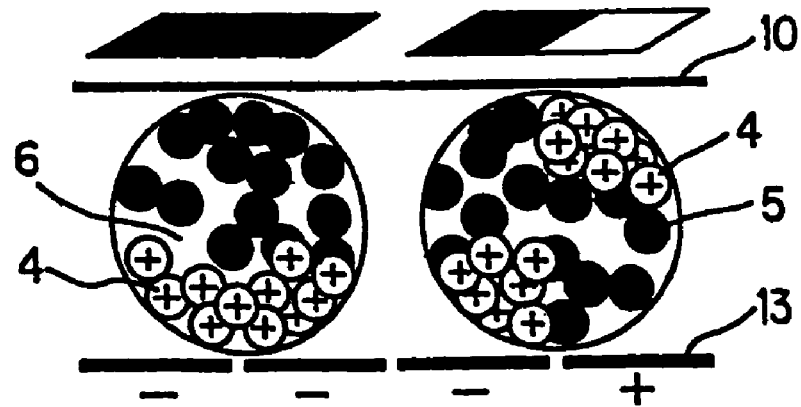
FIG. 11 is a schematic drawing of an electrophoretic display device using a display medium prepared by filling a structure comprising microcapsules with the liquid for electrophoretic display of a double particle type.

FIG. 10 is an electrophoretic display device using a display medium in which the liquid for electrophoretic display of the single particle type shown in FIG. 2 is encapsulated into a structure comprising microcapsules, and FIG. 11 is an electrophoretic display device using a display medium in which the liquid for electrophoretic display of the double particle type shown in FIG. 3 is encapsulated into a structure comprising microcapsules.

Figure 12:
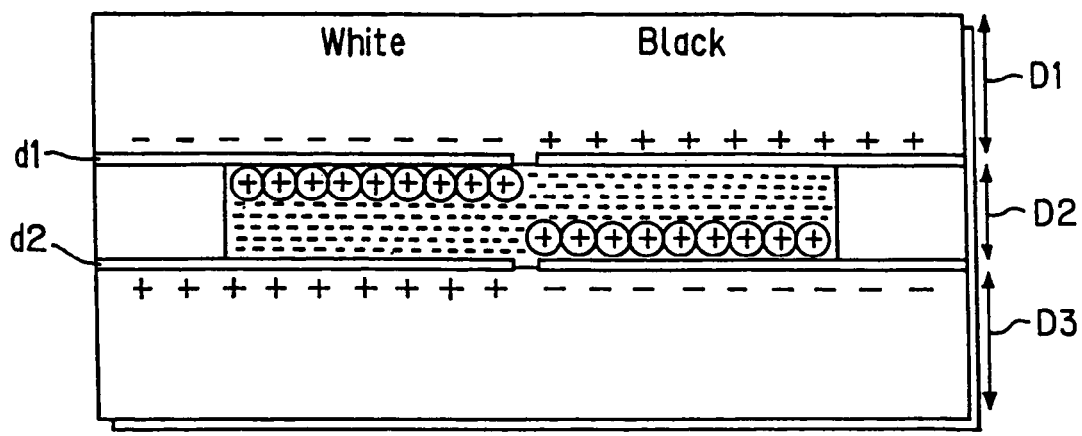
FIG. 12 is a cross-sectional drawing showing one example of use state of an electrophoretic display device.

In FIG. 12, shown is a schematic drawing of an electrophoretic display device in a case in which ITO glass electrodes having a thickness (D1, D3) of 1100 μm are used as counter electrodes and a sheet of a spacer having a thickness (D2) of 500 μm is used to apply voltage, and d1 and d2 are a thickness (0.15 μm) of an ITO thin film.

Also, in addition to the microcapsule type described above, a film-shaped sheet having a lot of cells filled with the liquid for electrophoretic display may be interposed between counter electrodes in the electrophoretic display device in the present invention.

In respect to a forming method of the sheet for receiving the liquid for electrophoretic display, it can be prepared by forming fine cells on a thin film sheet by applying various UV laser processing techniques or by a photoetching method and various printing methods.

The electrophoretic display device thus constituted according to the present invention has a high contrast and can display the contrast with high reliability even in repetitive display, and the characteristics in which a response is excellent are realized.

EXAMPLES

Next, the present invention shall be explained in detail with reference to examples and comparative examples, but the present invention shall not be restricted to the following.

Examples 1 to 19 and Comparative Examples 1 to 6

Preparation of Liquids for Electrophoretic Display, the First Invention

Blend compositions of the respective examples and comparative examples shown in the following Table 1 were dispersed for 60 minutes by means of a paint shaker using glass beads to prepare liquids for electrophoretic display.

Used were fine particles (A-1 to A-8 and B-1 to B-2), dyes, dispersion liquid media (C-1 to C-3), dispersants (D-1 to D-4) and alkylpolyetheramines (E-1 to E-6) each shown below.

Fine Particles A:

A-1: ITT-2 $TiO_2$ CR-50 (manufactured by Nikko Chemicals Co., Ltd.), titanium oxide treated the surface with a titan coupling agent, mean particle size: about 0.4 μm A-2: ITT-7 $TiO_2$ TTO-S-3 (manufactured by Nikko Chemicals Co., Ltd.), fine particle titanium oxide treated the surface with a titan coupling agent, mean particle size: 0.05 to 0.1 μm A-3: KR-380 (manufactured by Titan Kogyo Co., Ltd.), titanium oxide treated the surface with a lipophilic surface treating agent, mean particle size: about 0.5 μm A-4: KR-270 (manufactured by Titan Kogyo Co., Ltd.), titanium oxide treated the surface with a lipophilic surface treating agent, mean particle size: about 0.4 μm A-5: Technopolymer MBX-20 White (manufactured by Sekisui Plastics Co., Ltd.), PMMA colored fine particles, mean particle size: about 20 μm A-6: Tipaque CR-50 (manufactured by Ishihara Sangyo Kaisha, Ltd.), titanium oxide having a hydrophilic surface, mean particle size: about 0.4 μm A-7: particles (mean particle size: about 0.4 μm) prepared by treating Tipaque CR-50 (manufactured by Ishihara Sangyo Kaisha, Ltd.) with Plenact AL-M (manufactured by Ajinomoto Co., Inc.)

A-8: particles (mean particle size: about 0.4 μm) prepared by treating Tipaque CR-50 (manufactured by Ishihara Sangyo Kaisha, Ltd.) with KBE-503 (silane base coupling agent, manufactured by Shin-Etsu Chemical Co., Ltd.)

Fine Particles B:

B-1: Rubcouleur 220(MD) Black (acryl copolymer colored beads, manufactured by Dainichiseika Color & Chemicals MFG. Co., Ltd.), mean particle size: about 10 μm B-2: ITT-2 BLACK BL-100 (manufactured by Nikko Chemicals Co., Ltd.), black iron oxide treated the surface with a titan coupling agent, mean particle size: about 0.25 μm Colorant (dye):
Oil Blue N (dye, manufactured by Wako Pure Chemical Industries, Ltd.)

Dispersion Liquid Medium C:
C-1: xylene
C-2: normal paraffin H (manufactured by Nippon Petrochemicals Co., Ltd.)
C-3: Nisseki Isosol H (manufactured by Nippon Petrochemicals Co., Ltd.)

Dispersant D:
D-1: sorbitan monooleate
D-2: sorbitan trioleate
D-3: NIKKOL DDP-2 (manufactured by Nikko Chemicals Co., Ltd., anionic surfactant)
D-4: oleic acid Alkylpolyetheramine E:
E-1: Nymeen L-201 (manufactured by NOF Corporation), hydroxyethyllaurylamine
E-2: Nymeen L-202 (manufactured by NOF Corporation), polyethylene glycol laurylamine
E-3: Nymeen S-202 (manufactured by NOF Corporation), polyethylene glycol stearylamine
E-4: Nymeen $T_2$-202 (manufactured by NOF Corporation), polyethylene glycol alkyl(beef tallow)amine
E-5: Nymeen DT-203 (manufactured by NOF Corporation), polyoxyethylene alkyl(beef tallow)propylenediamine
E-6: trioctylamine The respective liquids for electrophoretic display obtained according to the formulations shown in Table 1 described above were used to prepare media for electrophoretic display by methods described below, and evaluation of a reflectance on the white display face, visual evaluation of the white display face, evaluation of a reflectance on the colored display face, visual evaluation of the colored display face, evaluation of coagulation and adhesion of the fine particles and evaluation of the response and the contrast were carried out by the following respective evaluation methods.

The results obtained by evaluating the physical properties of the above media for electrophoretic display are shown in the following Table 2.

Preparation of Media for Electrophoretic Display Using the Liquids for Electrophoretic Display Glass substrates (thickness: 1.1 mm) in which a transparent conductive film (ITO film) was formed in a thickness of 0.15 μm on one surface were used as a substrate in which an electrode was provided on one surface, and a pair of the glass substrates were oppositely disposed via spacers of about 500 μm to form a cell.

The liquids for electrophoretic display prepared according to the formulations shown in Table 1 described above were filled into the above space to thereby prepare media for electrophoretic display.

TABLE 1

(blend unit: % by weight, total amount: 100)

| | Fine particle | | | | | | |
|---|---|---|---|---|---|---|---|
| | Fine particle A | Fine particle B | Colorant | Dispersion liquid medium C | | Dispersant D | Alkylpoly-etheramine E |
| Example 1 | A-1 10 | — | 0.1 | C-1 81.9 | — | D-1 4 | E-1 4 |
| Example 2 | A-1 10 | B-1 5 | — | C-3 77.0 | — | D-2 3 | E-3 5 |
| Example 3 | A-1 10 | B-1 5 | — | C-3 77.0 | — | D-2 3 | E-1 5 |
| Example 4 | A-1 10 | B-1 5 | — | C-3 78.0 | — | D-2 3 | E-2 4 |
| Example 5 | A-1 10 | B-1 5 | — | C-3 78.0 | — | D-2 3 | E-4 4 |
| Example 6 | A-1 10 | B-1 5 | — | C-1 34.85 | — | D-4 50 | E-4 0.15 |
| Example 7 | A-1 7 | B-1 5 | — | C-1 54.7 | — | D-4 30 | E-4 0.3 |
| Example 8 | A-1 10 | B-1 5 | — | C-1 73.0 | — | D-1 10 | E-3 2 |
| Example 9 | A-1 10 | B-1 5 | — | C-1 37.5 | C-3 37.5 | D-2 5 | E-3 5 |
| Example 10 | A-1 10 | B-1 5 | — | C-1 36.0 | C-3 36.0 | D-2 3 | E-1 10 |
| Example 11 | A-1 10 | B-1 5 | — | C-1 69.99 | — | D-2 0.01 | E-1 20 |
| Example 12 | A-1 10 | B-1 5 | — | C-3 76.0 | — | D-3 5 | E-3 4 |
| Example 13 | A-3 10 | B-1 5 | — | C-3 77.0 | — | D-2 3 | E-3 5 |
| Example 14 | A-4 10 | B-1 5 | — | C-3 77.0 | — | D-2 3 | E-3 5 |
| Example 15 | A-7 10 | B-1 5 | — | C-3 77.0 | — | D-2 3 | E-3 5 |
| Example 16 | A-8 10 | B-1 5 | — | C-3 77.0 | — | D-2 3 | E-3 5 |
| Example 17 | A-5 10 | B-1 4 | — | C-3 78.0 | — | D-2 3 | E-3 5 |
| Example 18 | A-2 10 | B-1 2 | — | C-3 78.0 | — | D-2 3 | E-3 5 |
| Example 19 | A-5 10 | B-2 2 | — | C-3 78.0 | — | D-2 3 | E-3 5 |
| Comparative Example 1 | A-1 10 | — | 0.1 | C-1 84.9 | — | D-1 5 | — |
| Comparative Example 2 | A-1 10 | B-1 5 | — | C-3 84.9 | — | — | E-3 0.1 |
| Comparative Example 3 | A-1 10 | B-1 5 | — | C-1 40.0 | C-3 40.0 | D-2 5 | — |
| Comparative Example 4 | A-6 10 | B-1 5 | — | C-3 77.0 | — | D-2 3 | E-1 5 |
| Comparative Example 5 | A-1 10 | B-1 5 | — | C-3 75.0 | — | D-2 3 | E-5 5 |
| Comparative Example 6 | A-1 10 | B-1 5 | — | C-3 77.0 | — | D-2 3 | E-6 5 |

Evaluation of Physical Properties of Media for Electrophoretic

The respective media for electrophoretic display prepared in the examples and the comparative examples by the method described above were electrophoresed by applying a voltage of +200 V or −200 V to the electrodes of the medium to measure a reflectance on a white or colored display face formed by means of MSC-5N (manufactured by Suga Test Instruments Co., Ltd., hereinafter the same shall apply).

Further, visual evaluation of white display and colored display, evaluation of coagulation and adhesion state of the particles and evaluation of a contrast ratio were carried out by the following methods.

Visual Evaluation of White Display and Colored Display

Whiteness of the white display face and a color density of the colored display face which were displayed by applying voltage were sensorily evaluated according to the following evaluation criteria.

Visual Evaluation Criteria of the White Display Face:
○: white
Δ: a little colored
X: strongly colored Visual Evaluation Criteria of the Colored Display Face:
○: fine and strongly colored
Δ: a little whitish
X: whitish

Evaluation of Coagulation and Adhesion State of Particles and Response

Coagulation of the particles and an adhesion state thereof onto the electrode surface were evaluated according to the following evaluation criteria by visually observing a change and a state of a color tone of the displayed part when applying hundred times a voltage of +200 V or −200 V alternately at an interval of one second to switch over the display.

Further, a response of a display change corresponding to switching over of the voltage was evaluated according to the following evaluation criteria.

Evaluation Criteria of Coagulation and Adhesion State of Particles:
○: little coagulation and adhesion
Δ: coagulation and adhesion are a little observed
X: coagulation and adhesion are caused Evaluation Criteria of Response:
○: quickly changed
Δ: reaction is a little delayed
X: reaction is delayed

Evaluation of Contrast Ratio

A voltage of +200 V or −200 V was applied to set one visible display part to white display, and a focus was concentrated onto an outermost side display face thereof to measure white color reflection by 45° irradiation—vertical light reception. Then, a voltage of −200 V or +200 V which was reverse to the first polarity was applied to change the visible display part to colored display, and a reflectance on the colored display face was measured in the same manner. The contrast ratio was calculated from a ratio thereof (reflectance of the white display face/reflectance of the colored display face).

TABLE 2

| | Reflectance on white display face | Visual evaluation of white display face | Reflectance on colored display face | Visual evaluation of colored display face | Coagulation and adhesion of fine particles | Response | Contrast |
|---|---|---|---|---|---|---|---|
| Example 1 | 35 | ○ to Δ | 8 | ○ to Δ | ○ | ○ | 4.4 |
| Example 2 | 53 | ○ | 5 | ○ | ○ | ○ | 8.8 |
| Example 3 | 53 | ○ | 6 | ○ | ○ | ○ | 8.8 |
| Example 4 | 51 | ○ | 5 | ○ | ○ | ○ | 10.2 |
| Example 5 | 50 | ○ | 6 | ○ | ○ | ○ | 8.3 |
| Example 6 | 51 | ○ | 7 | ○ | ○ | ○ to Δ | 7.3 |
| Example 7 | 54 | ○ | 7 | ○ | ○ | ○ to Δ | 7.7 |
| Example 8 | 53 | ○ | 6 | ○ | ○ | ○ to Δ | 8.8 |
| Example 9 | 54 | ○ | 7 | ○ | ○ | ○ | 7.7 |
| Example 10 | 53 | ○ | 6 | ○ | ○ | ○ | 8.8 |
| Example 11 | 47 | ○ | 7 | ○ | ○ | ○ to Δ | 8.7 |
| Example 12 | 52 | ○ | 7 | ○ | ○ | ○ | 7.4 |
| Example 13 | 52 | ○ | 6 | ○ | ○ | ○ | 8.7 |
| Example 14 | 50 | ○ | 6 | ○ | ○ | ○ | 8.3 |
| Example 15 | 51 | ○ | 7 | ○ | ○ | ○ | 7.3 |
| Example 16 | 52 | ○ | 7 | ○ | ○ | ○ | 7.4 |
| Example 17 | 42 | ○ | 7 | ○ | ○ | ○ | 6.0 |
| Example 18 | 35 | ○ | 8 | ○ | ○ | ○ | 4.4 |
| Example 19 | 35 | ○ | 11 | ○ | ○ | ○ | 3.8 |
| Comparative Example 1 | 35 | Δ | 8 | X | Δ | Δ | 4.4 |
| Comparative Example 2 | 30 | Δ | 13 | Δ | Δ | Δ | 2.3 |
| Comparative Example 3 | 32 | Δ | 8 | Δ | Δ | Δ | 0.6 |
| Comparative Example 4 | the particles were dispersed but immediately coagulated, so that evaluation was impossible | | | | | | |

TABLE 2-continued

| | Total evaluation | | | | | | |
|---|---|---|---|---|---|---|---|
| | Reflectance on white display face | Visual evaluation of white display face | Reflectance on colored display face | Visual evaluation of colored display face | Coagulation and adhesion of fine particles | Response | Contrast |
| Comparative Example 5 | 20 | Δ | 16 | Δ | Δ | X | 1.3 |
| Comparative Example 6 | 24 | Δ | 15 | Δ | Δ | Δ | 1.6 |

As apparent from the results shown in Table 2 described above, it has been found that the media for electrophoretic display prepared in Examples 1 to 19 falling in the scope of the present invention are excellent, as compared with the media for electrophoretic display prepared in Comparative Examples 1 to 6 falling outside the scope of the present invention, in a reflectance on the white display face and the colored display face and excellent as well in a hue of white display and colored display which are visually observed and that they are free of coagulation and adhesion of the fine particles and excellent in a response and a contrast.

Next, the devices of a microcapsule type (MC) and a sheet type (S) for electrophoretic display were prepared by methods described below, and evaluation of a reflectance on the white display face, visual evaluation of the white display face, evaluation of a reflectance on the colored display face, visual evaluation of the colored display face, evaluation of coagulation and adhesion of the fine particles and evaluation of the response and the contrast were carried out by the respective evaluation methods described above.

The results obtained by evaluating the physical properties of the devices for electrophoretic display are shown in the following Table 3.

Microcapsule Type Example 1

(1) Preparation of a Liquid for Electrophoretic Display
A dispersion of 100 g was prepared according to the formulation described in Example 2 described above.

(2) Micro-Capsulation
A 5% by weight gelatin aqueous solution of 200 g and a 5% by weight gum arabic aqueous solution of 200 g were mixed while stirring and heated to 50° C., and a pH of the solution was controlled to 9.0 by a sodium hydroxide aqueous solution. The dispersion for electrophoretic display prepared in (1) described above was added to the aqueous solution while slowly stirring to prepare an emulsion.

Next, the pH was reduced to 4.0 by using an acetic acid aqueous solution under a prescribed stirring condition to form a gelatin/gum arabic coacervate, and then it was cooled down to about 5° C. in about 30 minutes.

Next, a 35% formalin aqueous solution of 10 g was added thereto, and the solution was heated up to 50° C. to carry out curing reaction for about 2 hours, whereby a slurry of microcapsules was prepared. The microcapsules thus obtained had a mean particle size of 80 µm.

(3) Evaluation of Device
A water-based urethane base binder solution of 1.5 part was mixed with the microcapsule slurry of 1 part obtained in (2) described above, and the mixture was coated on an ITO transparent electrode on a PET base material by means of an applicator coating machine and sufficiently dried under the condition of 50° C.

The cell for display was adhered on a counter electrode substrate and vacuum-pressed so that a gap between the counter electrodes was 60 µm to prepare a display device and evaluate it.

Microcapsule Type Example 2

(1) Preparation of a Liquid for Electrophoretic Display
A dispersion of 100 g was prepared according to the formulation described in Example 9 described above.

(2) Micro-Capsulation
Hexamethylenediisocyanate (HDI) of 10 g was dissolved in the dispersion (1) described above, and then the solution was immediately added to a 5% by weight gelatin aqueous solution of 300 g under a prescribed stirring condition to prepare an emulsion. The temperature was held at 35° C. to continue stirring for 2 hours, and then the temperature of the system was cooled down to 5° C.

Next, the pH was controlled to 9.0 by sodium hydroxide, and then a 25% glutaraldehyde aqueous solution of 10 g was added thereto. The temperature of the system was elevated up to 50° C., and capsulation reaction was finished in about 2 hours. The microcapsules thus obtained had a mean particle size of 90 µm.

(3) Evaluation of Device
A water-based silicon base binder solution of 2 parts containing a prescribed amount of a dielectric constant-controlling material was mixed with the microcapsule slurry of 1 part obtained in (2) described above, and the mixture was coated on an ITO transparent electrode on a PET base material by means of an applicator coating machine and sufficiently dried under the condition of 50° C.

The cell for display was adhered on a counter electrode substrate and vacuum-pressed so that a gap between the counter electrodes was 60 µm to prepare a display device and evaluate it.

Microcapsule Type Example 3

(1) Preparation of a Liquid for Electrophoretic Display
A dispersion of 100 g was prepared according to the formulation described in Example 10 described above.

(2) Micro-Capsulation
A buret body 10 g of HDI was dissolved in the dispersion (1) described above, and then the solution was immediately added to a 5% by weight PVA aqueous solution of 300 g under a prescribed stirring condition to prepare an emulsion. The temperature was held at 60° C. to continue stirring for 3 hours, and then the pH was controlled to 9.0 by sodium hydroxide. Then, a 25% glutaraldehyde aqueous solution of 10 g was added thereto. The temperature of the system was elevated up to 50° C., and capsulation reaction was finished in about 2 hours. The microcapsules thus obtained had a mean particle size of 75 μm.

(3) Evaluation of Device

A PVA base binder solution of 2 parts containing a prescribed amount of a dielectric constant-controlling material was mixed with the microcapsule slurry of 1 part obtained in (2) described above, and the mixture was coated on an ITO transparent electrode on a PET base material by means of an applicator coating machine and sufficiently dried under the condition of 50° C.

The cell for display was adhered on a counter electrode substrate and vacuum-pressed so that a gap between the counter electrodes was 60 μm to prepare a display device and evaluate it.

Sheet Type Example 1

(1) Preparation of a Liquid for Electrophoretic Display

A dispersion of 100 g was prepared according to the formulation described in Example 2 described above.

(2) Evaluation of Sheet Type Ink-Filled Spacer Device

Figure 9:
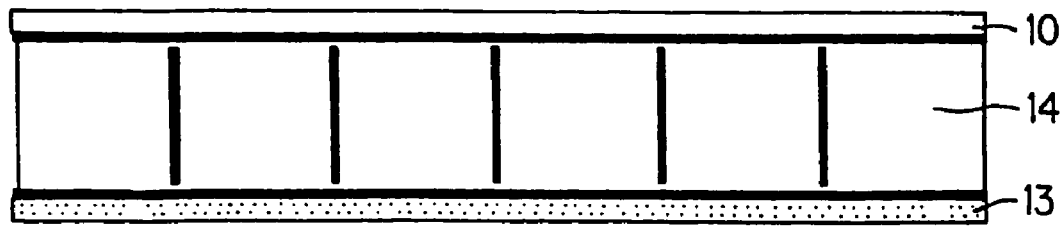
FIG. 9 is a cross-sectional drawing schematically showing another example of the embodiment in which a cell structure sheet is disposed between counter electrodes.

An electrophoretic ink was filled in a sheet patterned on a size pattern shown in FIG. 9, and this sheet was arranged on a counter electrode to an ITO transparent electrode on a PET base material to prepare a display device and evaluate it.

oxypropylene (POEOP) block polymers, a dispersant (D-2) and alkylpolyetheramines (E) each shown below.

Fine Particles A:
A-1: ITT-2 $TiO_2$ CR-50 (manufactured by Nikko Chemicals Co., Ltd.), titanium oxide treated the surface with a titan coupling agent, mean particle size: about 0.4 μm
B-1: Rubcouleur 220(MD) Black (acryl copolymer colored beads, manufactured by Dainichiseika Color & Chemicals MFG. Co., Ltd.), mean particle size: about 10 μm
Colorant (dye): Oil Blue N (manufactured by Wako Pure Chemical Industries, Ltd.)

Dispersion liquid medium C:
C-1: xylene
C-4: Nisseki Hisol SAS296 (diallylalkane, manufactured by Nippon Petrochemicals Co., Ltd.)

Polyoxyethylene Oxypropylene (POEOP) Block Polymer F:
F-1: Pronon 102 (average molecular weight: 1250, ethylene oxide amount: 20% by weight, manufactured by NOF Corporation)
F-2: Pronon 104 (average molecular weight: 1670, ethylene oxide amount: 40% by weight, manufactured by NOF Corporation)
F-3: Pronon 201 (average molecular weight: 2220, ethylene oxide amount: 10% by weight, manufactured by NOF Corporation)

TABLE 3

|  | Total evaluation | | | | | | |
| --- | --- | --- | --- | --- | --- | --- | --- |
|  | Reflectance on white display face | Visual evaluation of white display face | Reflectance on colored display face | Visual evaluation of colored display face | Coagulation and adhesion of fine particles | Response | Contrast |
| MC Example 1 | 35 | ◯ | 6 | ◯ | ◯ | ◯ | 6.6 |
| MC Example 2 | 30 | ◯ to Δ | 7 | ◯ | ◯ | ◯ | 6.6 |
| MC Example 3 | 28 | ◯ to Δ | 6 | ◯ | ◯ | ◯ | 7.1 |
| S Example 1 | 30 | ◯ to Δ | 6 | ◯ | ◯ | ◯ | 7.0 |

As apparent from the results shown in Table 3 described above, it has been found that the devices of the microcapsule type (MC) and the sheet type (S) for electrophoretic display are excellent in a reflectance on the white display face and the colored display face and excellent as well in a hue of white display and colored display which are visually observed and that they are free of coagulation and adhesion of the fine particles and excellent in a response and a contrast.

Examples 20 to 25 and Comparative Examples 7 to 11

Preparation of Liquids for Electrophoretic Display, the Second Present Invention Blend compositions of the respective examples and comparative examples shown in the following Table 4 were dispersed for 60 minutes by means of a paint shaker using glass beads to prepare liquids for electrophoretic display.

Used were fine particles (A-1 and B-1), a colorant (dye), dispersion liquid media (C-1 and C-4), polyoxyethylene F-4: Pronon 204 (average molecular weight: 3300, ethylene oxide amount: 40% by weight, manufactured by NOF Corporation)
F-5: Pronon 208 (average molecular weight: 10000, ethylene oxide amount: 80% by weight, manufactured by NOF Corporation)

Dispersant D:
D-2: sorbitan trioleate

Alkylpolyetheramine E:
E-1: Nymeen L-201 (manufactured by NOF Corporation), hydroxyethyllaurylamine
E-3: Nymeen S-202 (manufactured by NOF Corporation), polyethylene glycol stearylamine
E-5: Nymeen DT-203 (manufactured by NOF Corporation), polyoxyethylene alkyl(beef tallow)propylenediamine
E-6: trioctylamine

TABLE 4

(Blend unit: % by weight, total amount: 100)

| | Fine particle | | | Dispersion liquid media | | POEOP block | Dispersant | Alkylpoly- |
| --- | --- | --- | --- | --- | --- | --- | --- | --- |
| | A-1 | B-1 | Colorant | C-1 | C-4 | polymer F | D-2 | etheramine E |
| Example 20 | 10 | — | 0.1 | 16.0 | 63.9 | F-3 5 | — | E-3 5 |
| Example 21 | 10 | 5 | — | 15.4 | 61.6 | F-1 3 | — | E-1 5 |
| Example 22 | 10 | 5 | — | 23.1 | 53.9 | F-2 3 | — | E-1 5 |
| Example 23 | 10 | 5 | — | 15.4 | 61.6 | F-3 3 | — | E-3 5 |
| Example 24 | 10 | 5 | — | 18.4 | 56.6 | F-4 5 | — | E-3 5 |
| Example 25 | 10 | 5 | — | 19.4 | 56.6 | F-3 3 | 1 | E-3 5 |
| Comparative Example 7 | 10 | — | 0.1 | 24.6 | 57.3 | — | 5 | E-3 3 |
| Comparative Example 8 | 10 | — | 0.1 | 16.4 | 65.5 | F-3 5 | — | E-5 3 |
| Comparative Example 9 | 10 | 5 | — | 15.4 | 61.6 | F-5 3 | — | E-3 5 |
| Comparative Example 10 | 10 | 5 | — | 22.5 | 52.5 | F-3 5 | — | E-6 5 |
| Comparative Example 11 | 10 | 5 | — | 15.4 | 61.6 | — | 5 | E-5 3 |

The respective liquids for electrophoretic display obtained according to the formulation shown in Table 4 described above were used to prepare media for electrophoretic display by the same method as in Example 1 described above, and evaluation of a reflectance on the white display face, visual evaluation of the white display face, evaluation of a reflectance on the colored display face, visual evaluation of the colored display face, evaluation of coagulation and adhesion of the fine particles and evaluation of the response and the contrast were carried out by the respective evaluation methods described above. In addition thereto, coagulation and adhesion of the fine particles, the response and the contrast after stored at 50° C. for 1M (one month) were evaluated by the following evaluation methods.

The results obtained by evaluating the physical properties of the media for electrophoretic display are shown in the following Table 5.

Evaluation Methods of Coagulation and Adhesion of the Fine Particles, the Response and the Contrast After Stored at 50° C. for 1M (One Month)

The respective media for electrophoretic display prepared in Examples 20 to 25 and Comparative Examples 7 to 11 by the method described above were evaluated for coagulation and adhesion of the fine particles, a response and a contrast after stored at 50° C. for 1M (one month) by the respective evaluation methods described above.

TABLE 5

| | Reflectance on white display face | Visual evaluation of white display face | Reflectance on colored display face | Visual evaluation of colored display face | Coagulation and adhesion of fine particles | Response | Contrast | Coagulation of fine particles after stored 50° C., 1 M | Response after stored 50° C., 1 M | Contrast after stored 50° C., 1 M |
| --- | --- | --- | --- | --- | --- | --- | --- | --- | --- | --- |
| Example 20 | 34 | ○ to Δ | 8 | ○ to Δ | ○ | ○ | 4.3 | ○ | ○ | 4.3 |
| Example 21 | 52 | ○ | 6 | ○ | ○ | ○ to Δ | 8.7 | ○ | ○ to Δ | 8.6 |
| Example 22 | 53 | ○ | 7 | ○ | ○ | ○ | 7.6 | ○ | ○ | 7.7 |
| Example 23 | 55 | ○ | 7 | ○ | ○ | ○ | 7.9 | ○ | ○ | 7.9 |
| Example 24 | 50 | ○ | 6 | ○ | ○ | ○ | 8.3 | ○ | ○ | 8.3 |
| Example 25 | 55 | ○ | 6 | ○ | ○ | ○ | 9.2 | ○ | ○ | 9.1 |
| Comparative Example 7 | 32 | ○ to Δ | 8 | ○ to Δ | ○ | ○ | 4.0 | Δ | Δ | 3.1 |
| Comparative Example 8 | 30 | ○ to Δ | 8 | Δ | ○ | ○ | 3.8 | Δ | Δ | 3.0 |
| Comparative Example 9 | 40 | ○ | 7 | Δ | ○ to Δ | ○ to Δ | 5.7 | Δ | Δ | 4.5 |
| Comparative Example 10 | 42 | ○ | 7 | Δ | ○ to Δ | ○ to Δ | 6.0 | Δ | Δ | 4.3 |
| Comparative Example 11 | 30 | Δ | 6 | Δ | ○ to Δ | Δ | 5.0 | X | X | 3.8 |

As apparent from the results shown in Table 5 described above, it has been found that the media for electrophoretic display prepared in Examples 20 to 25 falling in the scope of the present invention are excellent, as compared with the media for electrophoretic display prepared in Comparative Examples 7 to 11 falling outside the scope of the present invention, in a reflectance on the white display face and the colored display face and excellent as well in a hue of white display and colored display which are visually observed and that they are free of coagulation and adhesion of the fine particles and excellent in a response and a contrast and in addition thereto, they are free of coagulation and adhesion of the fine particles and excellent in a response and a contrast even after stored at 50° C. for 1M (one month).

Next, the devices of a microcapsule type (MC) and a sheet type (S) for electrophoretic display were prepared by methods described below, and evaluation of a reflectance on the white display face, visual evaluation of the white display face, evaluation of a reflectance on the colored display face, visual evaluation of the colored display face, evaluation of coagulation and adhesion of the fine particles and evaluation of the response and the contrast and evaluation of coagulation and adhesion of the fine particles, the response and the contrast after stored at 50° C. for 1M (one month) were carried out by the respective evaluation methods described above.

The results obtained by evaluating the physical properties of the above devices for electrophoretic display are shown in the following Table 6.

Microcapsule Type Example 4

(1) Preparation of a Liquid for Electrophoretic Display

A dispersion of 100 g was prepared according to the formulation described in Example 20 described above.

(2) Micro-Capsulation

A 5% by weight gelatin aqueous solution of 200 g and a 5% by weight gum arabic aqueous solution of 200 g were mixed while stirring and heated to 50° C., and a pH of the solution was controlled to 9.0 by a sodium hydroxide aqueous solution. The dispersion for electrophoretic display prepared in (1) described above was added to the aqueous solution while slowly stirring to prepare an emulsion.

Then, the pH was reduced to 4.0 by using an acetic acid aqueous solution under a prescribed stirring condition to form a gelatin/gum arabic coacervate, and then it was cooled down to about 5° C. in about 30 minutes.

Next, a 35% formalin aqueous solution of 10 g was added thereto, and the solution was heated up to 50° C. to carry out curing reaction for about 2 hours, whereby a slurry of microcapsules was prepared. The microcapsules thus obtained had a mean particle size of 80 µm.

(3) Evaluation of Device

A water-based urethane base binder solution of 1.5 part was mixed with the microcapsule slurry of 1 part obtained in (2) described above, and the mixture was coated on an ITO transparent electrode on a PET base material by means of an applicator coating machine and sufficiently dried under the condition of 50° C.

The above cell for display was adhered on a counter electrode substrate and vacuum-pressed so that a gap between the counter electrodes was 60 µm to prepare a display device and evaluate it.

Microcapsule Type Example 5

(1) Preparation of a Liquid for Electrophoretic Display

A dispersion of 100 g was prepared according to the formulation described in Example 21 described above.

(2) Micro-Capsulation

Hexamethylenediisocyanate (HDI) of 10 g was dissolved in the dispersion (1) described above, and then the solution was immediately added to a 5% by weight gelatin aqueous solution of 300 g under a prescribed stirring condition to prepare an emulsion. The temperature was held at 35° C. to continue stirring for 2 hours, and then the temperature of the system was cooled down to 5° C.

Next, the pH was controlled to 9.0 by sodium hydroxide, and then a 25% glutaraldehyde aqueous solution of 10 g was added thereto. The temperature of the system was elevated up to 50° C., and capsulation reaction was finished in about 2 hours. The microcapsules thus obtained had a mean particle size of 90 µm.

(3) Evaluation of Device

A water-based silicon base binder solution of 2 parts containing a prescribed amount of a dielectric constant-controlling material was mixed with the microcapsule slurry of 1 part obtained in (2) described above, and the mixture was coated on an ITO transparent electrode on a PET base material by means of an applicator coating machine and sufficiently dried under the condition of 50° C.

The cell for display was adhered on a counter electrode substrate and vacuum-pressed so that a gap between the counter electrodes was 60 µm to prepare a display device and evaluate it.

Microcapsule Type Example 6

(1) Preparation of a Liquid for Electrophoretic Display

A dispersion of 100 g was prepared according to the formulation described in Example 22 described above.

(2) Micro-Capsulation

A buret form of HDI of 10 g was dissolved in the dispersion (1) described above, and then the solution was immediately added to a 5% by weight PVA aqueous solution of 300 g under a prescribed stirring condition to prepare an emulsion. The temperature was held at 60° C. to continue stirring for 3 hours, and then the pH was controlled to 9.0 by sodium hydroxide. Then, a 25% glutaraldehyde aqueous solution of 10 g was added thereto. The temperature of the system was elevated up to 50° C., and capsulation reaction was finished in about 2 hours. The microcapsules thus obtained had a mean particle size of 75 µm.

(3) Evaluation of Device

A PVA base binder solution of 2 parts containing a prescribed amount of a dielectric constant-controlling material was mixed with the microcapsule slurry of 1 part obtained in (2) described above, and the mixture was coated on an ITO transparent electrode on a PET base material by means of an applicator coating machine and sufficiently dried under the condition of 50° C.

The cell for display was adhered on a counter electrode substrate and vacuum-pressed so that a gap between the counter electrodes was 60 µm to prepare a display device and evaluate it.

Sheet Type Example 2

(1) Preparation of a Liquid for Electrophoretic Display

A dispersion of 100 g was prepared according to the formulation described in Example 23 described above.

(2) Evaluation of a Sheet Type Ink-Filled Spacer Device

An electrophoretic ink was filled in a sheet patterned on a size pattern shown in FIG. 9, and this sheet was arranged on a counter electrode to an ITO transparent electrode on a PET base material to prepare a display device and evaluate it.

TABLE 6

|  | Reflectance on white display face | Visual evaluation of white display face | Reflectance on colored display face | Visual evaluation of colored display face | Coagulation and adhesion of fine particles | Response | Contrast | Coagulation of fine particles after stored 50° C., 1 M | Response after stored 50° C., 1 M | Contrast after stored 50° C., 1 M |
|---|---|---|---|---|---|---|---|---|---|---|
| MC Example 4 | 32 | ○ to Δ | 7 | ○ to Δ | ○ | ○ | 4.0 | ○ | ○ | 4.0 |
| MC Example 5 | 50 | ○ | 6 | ○ | ○ | ○ to Δ | 8.1 | ○ | ○ to Δ | 8.1 |
| MC Example 6 | 50 | ○ | 6 | ○ | ○ | ○ | 7.1 | ○ | ○ | 7.2 |
| S Example 2 | 53 | ○ | 7 | ○ | ○ | ○ | 7.6 | ○ | ○ | 7.6 |

As apparent from the results shown in Table 6 described above, it has been found that the devices of the microcapsule type (MC) and the sheet type (S) for electrophoretic display are excellent in a reflectance on a white display face and a colored display face and excellent as well in a hue of white display and colored display which are visually observed; they are free of coagulation and adhesion of the fine particles and excellent in a response and a contrast; and in addition thereto, they are free of coagulation and adhesion of the fine particles and excellent in a response and a contrast even after stored at 50° C. for 1M (one month).

Examples 26 to 30 and Reference Examples 1 to 5

Preparation of Liquids for Electrophoretic Display, the Third Invention

Blend compositions of the respective examples and reference examples shown in the following Table 7 were dispersed for 60 minutes by means of a paint shaker using glass beads to prepare liquids for electrophoretic display.

Used were fine particles (A-1 and B-1), a colorant (dye), dispersion liquid media (C-1 and C-4), acetylene derivatives (G-1 to G-2), a polyoxyethylene oxypropylene (POEOP) block polymer F, a dispersant D and alkylpolyetheramine E each shown below.

Fine Particles A:
A-1: ITT-2 TiO$_2$ CR-50 (manufactured by Nikko Chemicals Co., Ltd.), titanium oxide treated the surface with a titan coupling agent, mean particle size: about 0.4 μm B-1: Rubcouleur 220(MD) Black (acryl copolymer colored beads, manufactured by Dainichiseika Color & Chemicals MFG. Co., Ltd.), mean particle size: about 10 μm Colorant (dye): Oil Blue N (manufactured by Wako Pure Chemical Industries, Ltd.)

Dispersion Liquid Medium C:
C-1: xylene
C-4: Nisseki Hisol SAS296 (diarylalkane, manufactured by Nippon Petrochemicals Co., Ltd.)

Acetylene Derivative G:
G-1: Surfynol 104DPM (HLB: 4, manufactured by Nissin Chemical Industry Co., Ltd.)
G-2: Surfynol DF110D (HLB: 3, manufactured by Nissin Chemical Industry Co., Ltd.)

Polyoxyethylene Oxypropylene (POEOP) Block Polymer F:
Pronon 102 (average molecular weight: 1250, ethylene oxide amount: 20% by weight, manufactured by NOF Corporation)

Dispersant D: Sorbitan Trioleate

Alkylpolyetheramine E: Nymeen L-201 (manufactured by NOF Corporation), hydroxyethyllaurylamine

TABLE 7

|  | Fine particle | | Colorant | Dispersion liquid media C | | Acetylene derivative G | POEOP block polymer F | Dispersant D | Alkylpoly- etheramine E | Hydrophilization treatment to substrate |
|---|---|---|---|---|---|---|---|---|---|---|
|  | A-1 | B-1 |  | C-1 | C-4 |  |  |  |  |  |
| Example 26 | 10 | — | 0.1 | 40.4 | 40.4 | D-1 0.1 | 5.0 | — | 4.0 | — |
| Example 27 | 15 | 7.5 | — | 34.7 | 34.7 | D-1 0.1 | 3.0 | — | 5.0 | — |
| Example 28 | 15 | 7.5 | — | 34.2 | 34.2 | D-2 0.1 | 4.0 | — | 5.0 | — |
| Example 29 | 15 | 7.5 | — | 33.2 | 33.2 | D-2 0.1 | 5.0 | 1.0 | 5.0 | Ozone treatment |
| Example 30 | 15 | 7.5 | — | 34.7 | 34.7 | D-2 0.1 | 3.0 | 1.0 | 4.0 | UV itoro treatment |
| Reference Example 1 | 15 | — | 0.1 | 37.9 | 38.0 | — | 5.0 | — | 4.0 | — |
| Reference Example 2 | 15 | 7.5 | — | 34.7 | 34.8 | — | 3.0 | — | 5.0 | — |
| Reference Example 3 | 15 | 7.5 | — | 34.2 | 34.3 | — | 4.0 | — | 5.0 | — |
| Reference Example 4 | 15 | 7.5 | — | 33.2 | 33.3 | — | 5.0 | 1.0 | 5.0 | — |
| Reference Example 5 | 15 | 7.5 | — | 34.7 | 34.8 | — | 3.0 | 1.0 | 4.0 | — |

The respective liquids for electrophoretic display obtained according to the formulation shown in Table 7 described above were used to prepare media for electrophoretic display by methods described below, and evaluation of a reflectance on the white display face, visual evaluation of the white display face, evaluation of a reflectance on the colored display face, visual evaluation of the colored display face, evaluation of coagulation and adhesion of the fine particles and evaluation of the response and the contrast were carried out by the respective evaluation methods described above. Further, the display characteristics (coagulation and adhesion, contrast) after repetitive display (frequency: 1000 times, 5000 times and 10000 times) were evaluated by the following evaluation methods, and coagulation and adhesion of the fine particles and the response and the contrast after stored at 50° C. for 1M (one month) were evaluated by the evaluation methods described above.

The results obtained by evaluating the physical properties of the media for electrophoretic display are shown in the following Table 8.

Preparation of Media for Electrophoretic Display Using the Liquids for Electrophoretic Display Glass substrates (thickness: 1.1 mm) in which a transparent conductive film (ITO film) was formed in a thickness of 0.15

The liquids for electrophoretic display prepared according to the formulations shown in Table 7 described above were filled into the above space to thereby prepare media for electrophoretic display.

Evaluating Method of Repetitive Display Characteristics (Coagulation and Contrast)

The repetitive display characteristics were evaluated for coagulation and the contrast, and the display states in carrying out display 1000 times, 5000 times and 10000 times were evaluated according to the following evaluation criteria.

Evaluation Criteria:
○: no change from the initial state
Δ: coagulation and adhesion are partially observed on the electrode, and the contrast is a little deteriorated
X: coagulation and adhesion are heavily observed, and the contrast is notably deteriorated

TABLE 8

| | Reflectance on white display face | Visual evaluation of white display face | Reflectance on colored display face | Visual evaluation of colored display face | Initial coagulation & adhesion of fine particles | Response | Contrast | Repetitive display characteristic (coagulation, contrast) | | | After stored 50° C., 1 M | |
|---|---|---|---|---|---|---|---|---|---|---|---|---|
| | | | | | | | | 1000 times | 5000 times | 10000 times | Response | Contrast |
| Example 26 | 34 | ○ to Δ | 8 | ○ to Δ | ○ | ○ | 4.3 | ○ | ○ | ○ to Δ | ○ | 4.3 |
| Example 27 | 52 | ○ | 6 | ○ | ○ | ○ | 9.0 | ○ | ○ | ○ to Δ | ○ | 8.9 |
| Example 28 | 55 | ○ | 8 | ○ | ○ | ○ | 8.1 | ○ | ○ | ○ to Δ | ○ | 8.0 |
| Example 29 | 54 | ○ | 7 | ○ | ○ | ○ | 8.2 | ○ | ○ | ○ | ○ | 8.2 |
| Example 30 | 56 | ○ | 7 | ○ | ○ | ○ | 8.9 | ○ | ○ | ○ | ○ | 9.0 |
| Reference Example 1 | 34 | ○ to Δ | 8 | ○ to Δ | ○ | ○ | 4.3 | Δ | Δ | X | ○ | 4.3 |
| Reference Example 2 | 51 | ○ | 6 | ○ | ○ | ○ | 8.9 | Δ | Δ | X | ○ | 8.9 |
| Reference Example 3 | 54 | ○ | 7 | ○ | ○ | ○ | 8.0 | Δ | Δ | X | ○ | 8.1 |
| Reference Example 4 | 53 | ○ | 7 | ○ | ○ | ○ | 8.1 | Δ | Δ | X | ○ | 7.9 |
| Reference Example 5 | 54 | ○ | 7 | ○ | ○ | ○ | 9.0 | Δ | Δ | X | ○ | 8.8 |

μm on one surface were used as a substrate in which an electrode was provided on one surface, and a pair of the above glass substrates were oppositely disposed via spacers of about 100 μm to form a cell. Also, cells were formed in some of the tests using glass substrate subjected to ozone treatment and UV itoro treatment in order to observe the effect of hydrophilization treatment of the substrate electrode. In the ozone treatment, the glass substrates obtained above were subjected to ozone treatment (Mitsubishi Ozonizer OS-IN, manufactured by Mitsubishi Electric Corporation) at an ozone concentration of 20 g/m$^3$ for 60 minutes. In the UV itoro treatment, a fuel gas containing 0.0001 mole % of tetramethylsilane having a boiling point of 27° C. and 0.00001 mole % of tetramethoxysilane having a boiling point of 122° C. was used as a fuel gas to subject the glass substrate to silicification flame treatment for 0.5 second.

As apparent from the results shown in Table 8 described above, it has been found that the media for electrophoretic display prepared in Reference Examples 26 to 30 falling in the scope of the present invention are excellent, as compared with the media for electrophoretic display prepared in Refernce Examples 1 to 5, in a reflectance on a white display face and a colored display face and excellent as well in a hue of white display and colored display which are visually observed; they are free of coagulation and adhesion of the fine particles and excellent in a response and a contrast; in the repetitive display characteristics of 1000 times, 5000 times and 10000 times, they are free of coagulation and adhesion and excellent in a contrast; and in addition thereto, they are free of coagulation and adhesion of the fine particles and excellent in a response and a contrast even after stored at 50° C. for 1M (one month).

Next, the devices of a microcapsule type (MC) and a sheet type (S) for electrophoretic display were prepared by methods described below, and evaluation of a reflectance on the white display face, visual evaluation of the white display face, evaluation of a reflectance on the colored display face, visual evaluation of the colored display face, evaluation of coagulation and adhesion of the fine particles and evaluation of the response and the contrast, evaluation of the display characteristics (coagulation and adhesion, contrast) after repetitive display (frequency: 1000 times, 5000 times and 10000 times) and evaluation of coagulation and adhesion of the fine particles, the response and the contrast after stored at 50° C. for 1M (one month) were carried out by the respective evaluation methods described above.

The results obtained by evaluating the physical properties of the above devices for electrophoretic display are shown in the following Table 9.

Microcapsule Type Example 7

(1) Preparation of a Liquid for Electrophoretic Display

A dispersion of 100 g was prepared according to the formulation described in Example 27 described above.

(2) Micro-Capsulation

A 5% by weight gelatin aqueous solution of 200 g and a 5% by weight gum arabic aqueous solution of 200 g were mixed while stirring and heated to 50° C., and a pH of the solution was controlled to 9.0 by a sodium hydroxide aqueous solution. The dispersion for electrophoretic display prepared in (1) described above was added to the aqueous solution while slowly stirring to prepare an emulsion.

Then, the pH was reduced to 4.0 by using an acetic acid aqueous solution under a prescribed stirring condition to form a gelatin/gum arabic coacervate, and then it was cooled down to about 5° C. in about 30 minutes.

Next, a 35% formalin aqueous solution of 10 g was added thereto, and the solution was heated up to 50° C. to carry out curing reaction for about 2 hours, whereby a slurry of a microcapsule was prepared. The microcapsules thus obtained had a mean particle size of 80 μm.

(3) Evaluation of Device

A water-based urethane base binder solution of 1.5 part was mixed with the microcapsule slurry of 1 part obtained in (2) described above, and the mixture was coated on an ITO transparent electrode on a PET base material by means of an applicator coating machine and sufficiently dried under the condition of 50° C.

The cell for display was adhered on a counter electrode substrate and vacuum-pressed so that a gap between the counter electrodes was 60 μm to prepare a display device and evaluate it.

Sheet Type Example 3

(1) Preparation of a Liquid for Electrophoretic Display

A liquid for electrophoretic display of 100 g was prepared according to the formulation described in Example 2 described above.

(2) Evaluation of a Sheet Type Ink-Filled Spacer Device

The liquid for electrophoretic display was filled in a cell sheet having a cell gap of 80 μm in which patterns were formed on an ITO transparent electrode on a PET base material on a size pattern shown in FIG. 9 by a photoetching method, and a counter electrode was arranged thereon and sealed by a UV curing adhesive (UV3400, manufactured by Toagosei Co., Ltd., hereinafter the same shall apply) to prepare a display device and evaluate it.

Sheet Type Example 4

(1) Preparation of a Liquid for Electrophoretic Display

A liquid for electrophoretic display of 100 g was prepared according to the formulation described in Example 28 described above.

(2) Evaluation of a Sheet Type Ink-Filled Spacer Device

The liquid for electrophoretic display was filled in a polyimide-made cell sheet having a thickness of 50 μm which was patterned on a size pattern shown in FIG. 9 by a laser beam machining method, and a counter electrode were arranged thereon and sealed by the UV curing adhesive to prepare a display device and evaluate it.

Sheet Type Example 5

In the sheet type Example 13 described above, the ITO transparent electrode on which the cell patterns were formed and the counter electrode were subjected to ozone treatment (Mitsubishi Ozonizer OS-IN, manufactured by Mitsubishi Electric Corporation) at an ozone concentration of 20 g/m$^3$ for 60 minutes, and then the liquid for electrophoretic display was filled therein to prepare a display device.

Sheet Type Example 6

In the sheet type Example 14 described above, the ITO transparent electrode, the cell sheet and the counter electrode were subjected to UV itoro treatment, and then the liquid for electrophoretic display was filled therein to prepare a display device.

TABLE 9

| | Reflectance on white display face | Visual evaluation of white display face | Reflectance on colored display face | Visual evaluation of colored display face | Initial coagulation & adhesion of fine particles | Response | Contrast | Repetitive display characteristic (coagulation, contrast) | | | After stored 50° C., 1 M | |
|---|---|---|---|---|---|---|---|---|---|---|---|---|
| | | | | | | | | 1000 times | 5000 times | 10000 times | Response | Contrast |
| MC Example 7 | 50 | ◯ | 6 | ◯ | ◯ | ◯ to Δ | 8.0 | ◯ | ◯ | ◯ | ◯ | 7.9 |
| S Example 3 | 51 | ◯ | 6 | ◯ | ◯ | ◯ | 8.7 | ◯ | ◯ | ◯ | ◯ | 8.6 |
| S Example 4 | 53 | ◯ | 8 | ◯ | ◯ | ◯ | 7.9 | ◯ | ◯ | ◯ | ◯ | 7.9 |

TABLE 9-continued

| | Reflectance on white display face | Visual evaluation of white display face | Reflectance on colored display face | Visual evaluation of colored display face | Initial coagulation & adhesion of fine particles | Response | Contrast | Repetitive display characteristic (coagulation, contrast) | | | After stored 50° C., 1 M | |
|---|---|---|---|---|---|---|---|---|---|---|---|---|
| | | | | | | | | 1000 times | 5000 times | 10000 times | Response | Contrast |
| S Example 5 | 53 | ○ | 8 | ○ | ○ | ○ | 7.9 | ○ | ○ | ○ | ○ | 7.9 |
| S Example 6 | 53 | ○ | 8 | ○ | ○ | ○ | 8.0 | ○ | ○ | ○ | ○ | 7.9 |

As apparent from the results shown in Table 9 described above, it has been found that the devices of the microcapsule type (MC) and the sheet type (S) for electrophoretic display are excellent in a reflectance on a white display face and a colored display face and excellent as well in a hue of white display and colored display which are visually observed; they are free of coagulation and adhesion of the fine particles and excellent in a response and a contrast; in the repetitive display characteristics of 1000 times, 5000 times and 10000 times, they are free of coagulation and adhesion and excellent in a contrast; and in addition thereto, they are free of coagulation and adhesion of the fine particles and excellent in a response and a contrast even after stored at 50° C. for 1M (one month).

INDUSTRIAL APPLICABILITY

The display liquid for electrophoretic display thus constituted according to the present invention and the display medium and the display device each using the same can realize display having a high contrast and can display the contrast with high reliability even in repetitive display because of excellent dispersion stability of the display liquid for electrophoretic display, and they are excellent as well in a response, so that they can suitably be applied as portable type display devices for information terminal equipment, electronic price tags and electronic books.

What is claimed is:

1. A liquid for electrophoretic display comprising at least alkylpolyetheramine having a structural unit represented by the following Formula (I), a polyoxyethylene oxypropylene block polymer having a structural unit represented by the following Formula (II), one or more kinds of fine particles and a dispersion liquid medium, wherein a content of the alkylpolyetheramine is 1.0 to 200% by weight based on a content of fine particles:

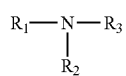

(I)

in Formula (I) described above, $R_1$ is a saturated hydrocarbon group or an unsaturated hydrocarbon group; $R_2$ is $(CH_2CH_2O)x$-H; $R_3$ is $(CH_2CH_2O)y$-H; and x and y are positive numbers;

$$OH(C_2H_4O)p(C_3H_6O)qH \quad (II)$$

in Formula (II) described above, p and q are positive numbers.

2. The liquid for electrophoretic display as described in claim 1, wherein the polyoxyethylene oxypropylene block polymer has an average molecular weight of 1,000 to 4,000.

3. The liquid for electrophoretic display as described in claim 1, wherein an amount of ethylene oxide in the polyoxyethylene oxypropylene block polymer is 50% by weight or less.

4. The liquid for electrophoretic display as described in claim 1, wherein a content of the polyoxyethylene oxypropylene block polymer is 0.01 to 30% by weight based on the total amount of the display liquid.

5. The liquid for electrophoretic display as described in claim 1, wherein the fine particles are subjected to surface treatment for making the fine particles lipophilic.

6. The liquid for electrophoretic display as described in claim 5, wherein the surface treatment for making the fine particles lipophilic is carried out with a coupling agent.

7. The liquid for electrophoretic display as described in claim 6, wherein the coupling agent is at least one agent selected from the group consisting of titanate base coupling agents, aluminum base coupling agents and silane base coupling agents.

8. The liquid for electrophoretic display as described in claim 5, wherein a surface functional group of the fine particles subjected to the surface treatment for making the fine particles lipophilic is an alkoxycarbonyl group.

9. The liquid for electrophoretic display as described in claim 1, wherein at least one kind of the fine particles is polymer fine particles containing a colorant, an organic pigment or an inorganic pigment.

10. The liquid for electrophoretic display as described in claim 9, wherein a structural component of the polymer fine particles containing a colorant is a cross-linked acryl base resin.

11. The liquid for electrophoretic display as described in claim 1, wherein the fine particles have a mean particle size of 0.05 to 20 μm.

12. The liquid for electrophoretic display as described in claim 1, further comprising a dispersant.

13. The liquid for electrophoretic display as described in claim 12, wherein the dispersant is a nonionic or anionic surfactant.

14. The liquid for electrophoretic display as described in claim 12, wherein a content of the dispersant is 0.01 to 50% by weight based on the total amount of the display liquid.

15. A medium for electrophoretic display wherein the liquid for electrophoretic display as described in claim 1 is filled into independent structures of microcapsules or cells in the medium.

16. The medium for electrophoretic display as described in claim 15, wherein in the structure of the cell filled with the liquid for electrophoretic display, an electrode part and a cell part that the liquid for electrophoretic display touches are subjected to hydrophilization treatment selected from the group consisting of ozone treatment, plasma treatment, corona treatment, UV itoro treatment, sputtering treatment, polymer layer-forming treatment, inorganic layer-forming treatment and organic or inorganic hybrid layer-forming treatment.

17. The medium for electrophoretic display as described in claim 15, wherein the microcapsule has a size of 10 to 200 µm.

18. The medium for electrophoretic display as described in claim 15, wherein the microcapsule has flexibility and is less liable to generate a space in arranging the microcapsules.

19. The medium for electrophoretic display as described in claim 15, wherein the independent cells have a volume of $1\times10^{-9}$ to $1\times10^{-3}$ ml.

20. An electrophoretic display device comprising a pair of substrates in which a light-transmitting electrode is formed on at least one substrate and the medium for electrophoretic display as described in claim 15 interposed between the above substrates.

* * * * *